(12) United States Patent
Ryu et al.

(10) Patent No.: US 12,519,680 B2
(45) Date of Patent: Jan. 6, 2026

(54) RECEIVER AND METHOD FOR CONTROLLING EQUALIZATION

(71) Applicant: SAMSUNG ELECTRONICS CO., LTD., Suwon-si (KR)

(72) Inventors: Kyungho Ryu, Suwon-si (KR); Hyunwook Lim, Suwon-si (KR); Beomcheol Kim, Suwon-si (KR); Jung-Pil Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 18/237,638

(22) Filed: Aug. 24, 2023

(65) Prior Publication Data
US 2024/0137251 A1 Apr. 25, 2024
US 2024/0235903 A9 Jul. 11, 2024

(30) Foreign Application Priority Data

Oct. 25, 2022 (KR) .................. 10-2022-0138424
Mar. 21, 2023 (KR) .................. 10-2023-0036789

(51) Int. Cl.
*H04L 25/03* (2006.01)

(52) U.S. Cl.
CPC .. *H04L 25/03267* (2013.01); *H04L 25/03019* (2013.01); *H04L 25/03057* (2013.01); *H04L 25/03878* (2013.01)

(58) Field of Classification Search
CPC ......... H04L 25/03006; H04L 25/03012; H04L 25/03019; H04L 25/03057; H04L 25/03159; H04L 25/03267; H04L 25/03878; H04L 25/03885
See application file for complete search history.

(56) References Cited

U.S. PATENT DOCUMENTS

| | | |
|---|---|---|
| 8,848,774 B2 | 9/2014 | Zhong et al. |
| 9,166,832 B1 | 10/2015 | Li et al. |
| 9,197,458 B1 | 11/2015 | Malhotra |
| 9,397,867 B1 | 7/2016 | Azenkot et al. |
| 9,787,505 B2 | 10/2017 | Lim et al. |
| 11,133,081 B2 | 9/2021 | M. et al. |
| 11,223,468 B1 | 1/2022 | Ryu et al. |

(Continued)

OTHER PUBLICATIONS

Yoo et al., "A 56Gb/s 7.7mW/GB/s PAM-4 Wireline Transceiver in 10nm FinFET Using MM-CDR-Based ADC Timing Skew Control and Low-Power DSP with Approximate Multiplier," ISSCC 2020 / SESSION 6 / Ultra-High-Speed Wireline / 6.4, IEEE International Solid-State Circuits Conference, 2020, Total 3 pages.

*Primary Examiner* — Betsy Deppe
(74) *Attorney, Agent, or Firm* — Sughrue Mion, PLLC

(57) ABSTRACT

A receiver includes a first equalizer that receives an input data signal through a communication channel and equalizes the input data signal based on a first control code to generate a first equalization signal, a second equalizer that equalizes the first equalization signal based on a clock signal and a second control code to generate a second equalization signal, a clock data recovery circuit that restores the clock signal based on the second equalization signal, deserializes the second equalization signal, and outputs a deserialized second equalization signal, and a controller that adjusts the first control code and the second control code based on the deserialized second equalization signal.

19 Claims, 36 Drawing Sheets

(56) References Cited

U.S. PATENT DOCUMENTS

2009/0316770 A1\* 12/2009 Hidaka ............ H04L 25/03057
375/233
2021/0359716 A1\* 11/2021 Masuda ............ H04L 25/03878
2022/0200605 A1   6/2022 Jang et al.

\* cited by examiner

FIG. 21

|      | td2 | td3 | td4 | td5 | te4 | Update $ACC_{1.5}$ |
|------|-----|-----|-----|-----|-----|--------------------|
| EQF1 | L   | L   | L   | H   | L   | +1                 |
| EQF2 | L   | H   | L   | H   | H   | +1                 |

FIG. 23

|      | td2 | td3 | td4 | td5 | te4    | Update $ACC_{1,5}$ |
|------|-----|-----|-----|-----|--------|--------------------|
| EQF1 | L   | L   | L   | H   | L or H | +1 or -1           |
| EQF2 | L   | H   | L   | H   | L or H | +1 or -1           |

FIG. 25

|      | td2 | td3 | td4 | td5 | te4 | Update $ACC_{1,5}$ |
|------|-----|-----|-----|-----|-----|--------------------|
| EQF1 | L   | L   | L   | H   | H   | -1                 |
| EQF2 | L   | H   | L   | H   | L   | -1                 |

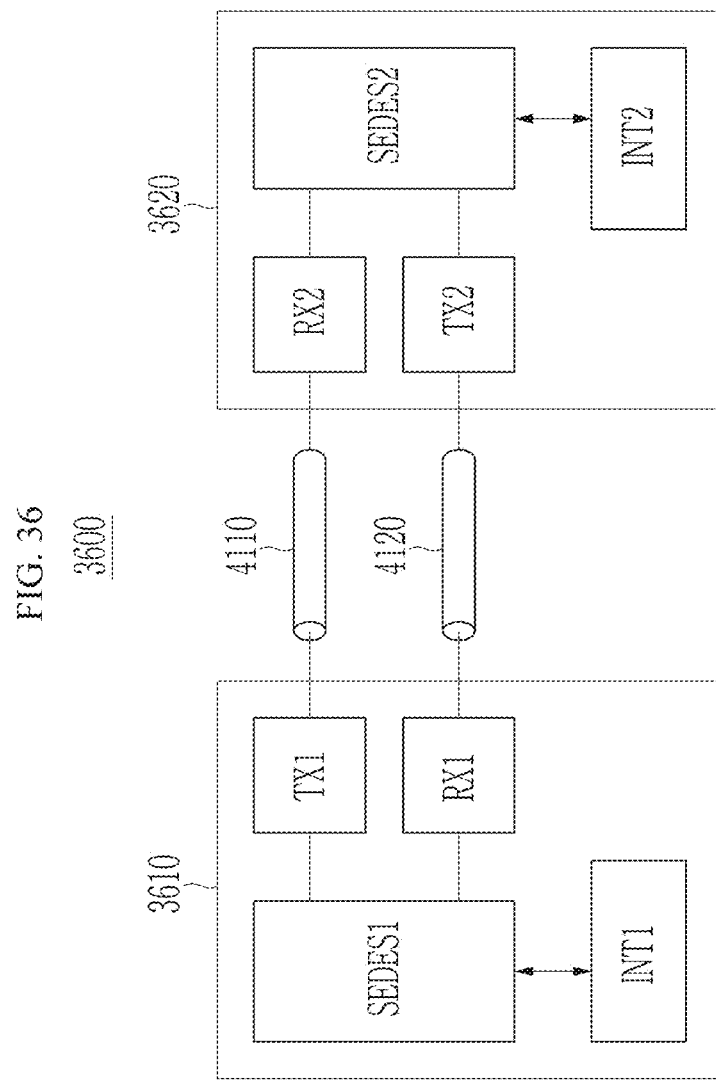

RECEIVER AND METHOD FOR CONTROLLING EQUALIZATION

CROSS-REFERENCE TO RELATED APPLICATION

This application claims priority to Korean Patent Application No. 10-2022-0138424 filed in the Korean Intellectual Property Office on Oct. 25, 2022, and Korean Patent Application No. 10-2023-0036789 filed in the Korean Intellectual Property Office on Mar. 21, 2023, the entire contents of each of which being incorporated by reference herein in their entireties.

BACKGROUND

The disclosure relates to a receiver and a method for controlling equalization.

Recently, various types of electronic devices have been used. An electronic device may perform unique functions according to operations of various electronic circuits included in the electronic device. An electronic device may operate independently or communicate with another electronic device.

As an amount of data exchanged between electronic devices increases, communication circuits capable of transmitting and receiving signals at high speed are employed. Electronic devices are connected to each other through a communication channel, and the communication channel transfers signals transmitted and received between the electronic devices.

However, a bandwidth of the communication channel may be limited due to various factors such as a skin effect, a dielectric loss, etc. These factors may cause distortion of signals transferred over the communication channel, and thus, the quality of signals transmitted at high speed may be deteriorated.

SUMMARY

It is an aspect to provide a receiver and a method for controlling equalization capable of improving a quality of a signal received by an electronic device by performing adaptive equalization on the signal.

According to an aspect of one or more embodiments, there is provided a receiver comprising a first equalizer configured to receive an input data signal through a communication channel and equalize the input data signal based on a first control code to generate a first equalization signal; a second equalizer configured to equalize the first equalization signal based on a clock signal and a second control code to generate a second equalization signal; a clock data recovery circuit configured to restore the clock signal based on the second equalization signal, deserialize the second equalization signal, and output a deserialized second equalization signal; and a controller configured to adjust the first control code and the second control code based on the deserialized second equalization signal.

According to another aspect of one or more embodiments, there is provided a receiver comprising a first equalizer configured to output a first equalization signal by removing, from a data signal, an interference of a pre-cursor positioned at −1 (unit intervals) UI with respect to a main cursor and an interference of one post-cursor positioned between +1 UI and +1.5 UI with respect to the main cursor; and a second equalizer configured to output a second equalization signal by removing an interference of a residual post-cursor from the first equalization signal.

According to yet another aspect of one or more embodiments, there is provided a method of controlling equalization, the method comprising obtaining a plurality of accumulation values for determining an equalized state; generating a first control code for controlling a continuous time linear equalizer (CTLE) based on a first accumulation value among the plurality of accumulation values that corresponds to a first tap coefficient and a second accumulation value among the plurality of accumulation values that corresponds to a second tap coefficient; and generating a plurality of second control codes for controlling a decision feedback equalizer (DFE) based on remaining accumulation values other than the first accumulation value and the second accumulation value among the plurality of accumulation values.

BRIEF DESCRIPTION OF THE DRAWINGS

FIGS. 20 and 21 are diagrams for explaining operations of a pattern filter and an operation logic in an under-equalized state according to some embodiments.

FIGS. 22 and 23 are diagrams for explaining operations of a pattern filter and an operation logic in a good equalized state according to some embodiments.

FIGS. 24 and 25 are diagrams for explaining operations of a pattern filter and an operation logic in an over-equalized state according to some embodiments.

FIG. 36 is a block diagram illustrating an electronic system including a receiver according to some embodiments.

DETAILED DESCRIPTION

Figure 1:
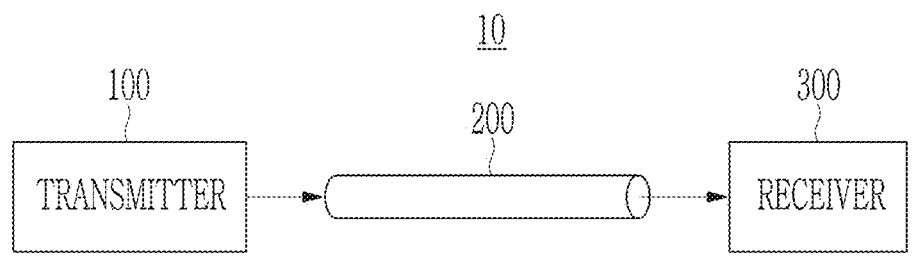
FIG. 1 is a schematic block diagram of an electronic system according to some embodiments.

Hereinafter, with reference to the accompanying drawings, various embodiments will be described in detail so that those skilled in the art may easily carry out the embodiments. However, aspects of the present disclosure may be embodied in many different forms and are not limited to the embodiments described herein.

Also, in order to provide a more clear explanation, parts irrelevant to the description are omitted in the drawings, and similar reference numerals are used for similar parts throughout the specification. In the flowcharts described with reference to the drawings, the order of operations may be changed, several operations may be merged, a certain operation may be divided, and a specific operation may not be performed.

In addition, expressions written in the singular may be interpreted in the singular or plural unless explicit expressions such as "one" or "single" are used. Terms including ordinal numbers, such as first and second, may be used to describe various components, but the components are not limited by these terms. These terms may be used for the purpose of distinguishing one component from another.

A receiver according to some embodiments may include a first equalizer configured to equalize an input data signal received through a communication channel based on a first control code to generate a first equalization signal, a second equalizer configured to equalize the first equalization signal based on a clock signal and a second control code to generate a second equalization signal, a clock data recovery circuit configured to restore the clock signal based on the second equalization signal, deserialize and output the second equalization signal, and a controller configured to adjust the first control code and the second control code based on the deserialized second equalization signal.

In some embodiments, the first equalizer may be a continuous time linear equalizer (CTLE).

In some embodiments, the second equalizer may be a decision feedback equalizer (DFE).

In some embodiments, the clock signal may include a plurality of data clock signals and a plurality of edge clock signals, and the second equalizer may include a plurality of data equalizers configured to equalize the first equalization signal based on the plurality of data clock signals to output a plurality of data bits, and a plurality of edge equalizers configured to equalize the first equalization signal based on the plurality of edge clock signals to output a plurality of edge bits.

In some embodiments, the number of the plurality of data equalizers and the number of the plurality of edge equalizers may be each equal to n, the clock data recovery circuit may output the clock signal at a rate of 1/n, and n may be an integer greater than 1.

In some embodiments, the second equalizer may further include an error sampler configured to equalize the first equalization signal based on one data clock signal among the plurality of data clock signals to output an error bit, and the controller may adjust the first control code and the second control code based on the plurality of data bits, the plurality of edge bits, and the error bit.

In some embodiments, the controller may adjust each of the first control code and the second control code by using a sign-sign least mean square (SSLMS) algorithm to the deserialized second equalization signal.

In some embodiments, the controller may obtain a first accumulation value and a second accumulation value by using the SSLMS algorithm to the deserialized second equalization signal, and adjust the first control code based on an operation result of applying a first weight value to the first accumulation value and applying a second weight value to the second accumulation value, and the first accumulation value and the second accumulation value may respectively correspond to different post-cursors.

In some embodiments, the controller may obtain the first accumulation value corresponding to an interference of a post-cursor of +1 UI with respect to a main cursor, and obtain the second accumulation value corresponding to an interference of a post-cursor of +1.5 UI with respect to the main cursor.

In some embodiments, the controller may decrease a value of the first control code when the operation result is higher than a previous operation result, increase the value of the first control code when the operation result is lower than the previous operation result, and maintain the value of the first control code when the operation result is equal to the previous operation result.

In some embodiments, the controller may obtain a weight offset corresponding to an interference of a pre-cursor and adjust the first weight value and the second weight value based on the weight offset.

In some embodiments, the controller may add the weight offset to the first weight value and subtract the weight offset from the second weight value.

In some embodiments, the controller may obtain a plurality of accumulation values by using the SSLMS algorithm to the deserialized second equalization signal, and adjust the second control code based on the plurality of accumulation values, and the plurality of accumulation values may respectively correspond to different post-cursors.

A receiver according to some embodiments may include a first equalizer configured to output a first equalization signal by removing an interference of a pre-cursor positioned at −1 UI with respect to a main cursor and an interference of one post-cursor positioned between +1 UI and +1.5 UI with respect to the main cursor from a data signal, and a second equalizer configured to output a second equalization signal by removing an interference of a residual post-cursor from the first equalization signal.

In some embodiments, the first equalizer may be a CTLE performing equalization in a frequency domain, and the second equalizer may be a DFE performing equalization in a time domain.

In some embodiments, the second equalizer may include a differential input unit configured to compare the first equalization signal with a reference voltage determined based on a control code of the second equalizer, and an amplification unit configured to amplify and output a comparison result of the differential input unit.

In some embodiments, the differential input unit may include a first receiving circuit configured to receive the first equalization signal, and second receiving circuits configured to receive different reference voltages and operate according to an internal select signal of the second equalizer.

In some embodiments, the second receiving circuits may be implemented as four second receiving circuits, the second receiving circuits may receive four different reference voltages and four different select signals, and only one of the second receiving circuits may be turned on according to the four different select signals and operate with the first receiving circuit.

A method of controlling equalization according to some embodiments may include obtaining a plurality of accumulation values for determining an equalized state, generating a first control code for controlling a continuous time linear equalizer (CTLE) based on a first accumulation value corresponding to a first tap coefficient and a second accumulation value corresponding to a second tap coefficient among the plurality of accumulation values, and generating second control codes for controlling a decision feedback equalizer (DFE) based on the remaining accumulation values among the plurality of accumulation values.

Figure 2:
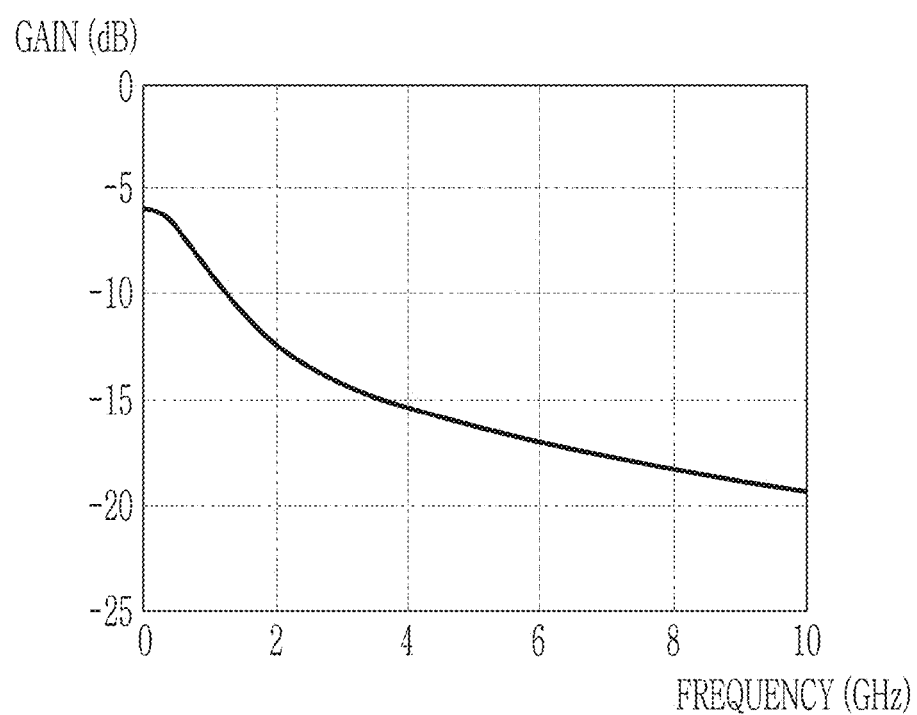
FIG. 2 is a graph illustrating a relationship between a frequency and a gain of a signal.
Figure 3:
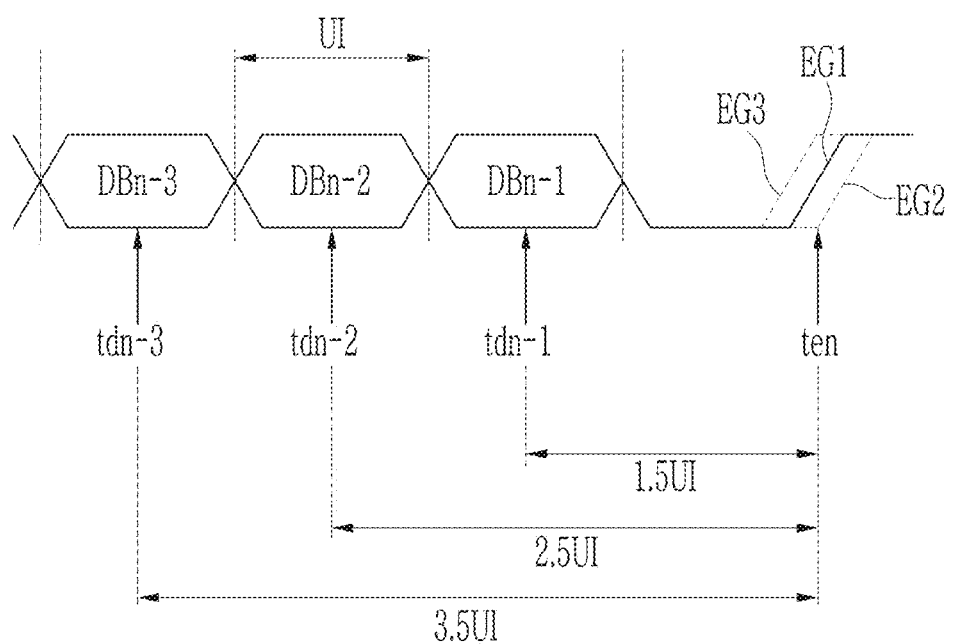
FIG. 3 is a diagram for explaining intersymbol interference of a signal transferred through a communication channel.
Figure 4:
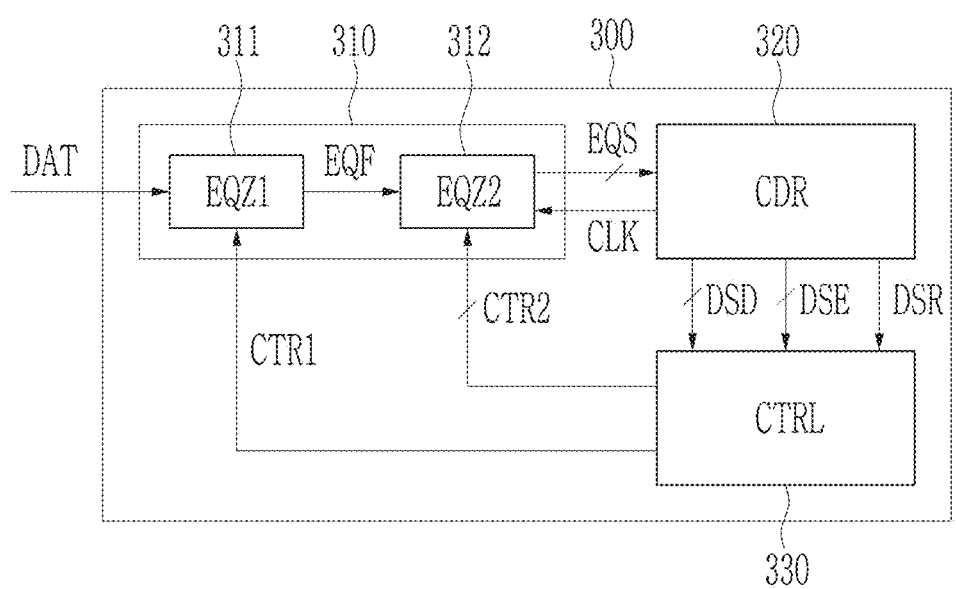
FIG. 4 is a block diagram of a receiver according to some embodiments.

In some embodiments, the generating of the first control code may include obtaining a third value by summing a first value obtained by multiplying the first accumulation value by a first weight value and a second value obtained by multiplying the second accumulation value by a second weight value, and adjusting the first control code to minimize the third value FIG. 1 is a schematic block diagram of an electronic system according to some embodiments. FIG. 2 is a graph illustrating a relationship between a frequency and a gain of a signal. FIG. 3 is a diagram for explaining inter symbol interference (ISI) of a signal transferred through a communication channel. FIG. 4 is a block diagram of a receiver according to some embodiments.

Referring to FIG. 1, an electronic system 10 may include a transmitter 100 and a receiver 300. The transmitter 100 and the receiver 300 may be implemented as being respectively included in different electronic devices or implemented as being included in one electronic device.

The electronic system 10 may include a communication channel 200 between the transmitter 100 and the receiver 300. The transmitter 100 may transmit data to the receiver 300 through the communication channel 200.

In an ideal case, the data from the transmitter 100 to the receiver 300 is transmitted in a lossless state, but this ideal transmission is substantially not the case. Digital pulse signals that were clear-out in the transmitter 100 due to a transfer function caused by a relatively long length of the communication channel 200 and/or due to material characteristics of the communication channel 200, etc. may be dispersed or spread in Gaussian form when reaching the receiver 300. Accordingly, the receiver 300 may restore and use data passing through the communication channel 200.

In an embodiment, the transmitter 100 may be a host, and the receiver 300 may be a memory device. The host may include a central processing unit (CPU), a graphics processing unit (GPU), or an application processor (AP), etc. The memory device may include a volatile memory device or a non-volatile memory device, etc.

In an embodiment, the transmitter 100 may be a host, and the receiver 300 may be a peripheral device. The peripheral device may include a display device, a communication device, a storage device, etc.

In an embodiment, the communication channel 200 may be implemented as a wired channel for wired communication, such as a copper wire on a PCB, or may be implemented as a wireless channel for wireless communication.

Referring to FIG. 2, when a signal output from the transmitter 100 of FIG. 1 passes through the communication channel 200 and reaches the receiver 300, characteristics of the signal are shown. In the graph, the X-axis represents a frequency and the Y-axis represents a gain.

As shown in FIG. 2, it may be seen that the gain of a high frequency signal is significantly lower than a gain of a low frequency signal. This difference is because a low frequency signal such as a DC component may have good transfer characteristics, but a signal attenuation phenomenon may occur due to an intersymbol interference (ISI) when transmitting a high frequency signal.

As described above, in a transmission/reception system such as the electronic system 10, an equalizer may be used as one of methods for removing the ISI of a signal. For example, the equalizer may include a continuous time linear equalizer (CTLE), a decision feedback equalizer (DFE), etc. The receiver 300 may optimally open an eye diagram of a signal by digitally performing adaptive equalization based on data bits and edge bits output by the equalizer. As a result, a performance of the electronic system 10 may be improved.

Referring to FIG. 3, a unit interval (UI) corresponds to a time between two adjacent transitions of data bits of an input data signal. The UI may correspond to a cycle period of a data clock signal and a cycle period of an edge clock signal.

In FIG. 3, tdn-3, tdn-2, and tdn-1 denote data sampling time points of data bits DBn-3, DBn-2, and DBn-1, respectively, and ten denotes an edge sampling time. In other words, the data sampling time points tdn-3, tdn-2, and tdn-1 correspond to edges (e.g., rising edges) of the data clock signal, and the edge sampling time point ten may correspond to an edge of the edge clock signal.

Levels of data symbols or the data bits DBn-3, DBn-2, and DBn-1 preceding the edge sampling time point ten by 1.5 UI, 2.5 UI, and 3.5 UI, respectively, affect an edge EG1 of the edge sampling time point ten due to the ISI.

In an under-equalized state, when a value of a preceding data bit is 0, an original edge EG1 is moved to a delayed edge EG2, and when the value of the preceding data bit is 1, the original edge EG1 is moved to a preceding edge EG3. Conversely, in an over-equalized state, when the value of the preceding data bit is 1, the original edge EG1 is moved to the delayed edge EG2, and when the value of the preceding data bit is 0, the original edge EG1 is moved to the preceding edge EG3.

The receiver 300 of FIG. 1 may compare the preceding data bits DBn-3, DBn-2, and DBn-1 with edge bits, respectively, to determine an equalized state. In other words, the receiver 300 may compare each data bit with each edge bit to determine the equalized state of an input data signal. The edge bit that is a comparison target may be a bit sampled later than the data bit by w times the unit interval UI. Here, w may be 1, 1.5, 2, 2.5, 3, etc. For example, when w is 1.5, the receiver 300 may compare the data bit DBn-1 with an edge bit at the edge sampling time point ten to determine an equalized state.

The receiver 300 may adaptively adjust an equalization strength of the equalizer based on the equalized state. For example, the receiver 300 may increase a value of a control code so that the equalization strength of the equalizer increases in the under-equalized state. The receiver 300 may decrease the value of the control code so that the equalization strength of the equalizer decreases in the over-equalized state. As a result, the eye diagram of the input data signal is optimally opened, and the performance of the electronic system 10 may be improved.

Referring to FIG. 4, the receiver 300 according to some embodiments may include an equalizer set 310, a clock data recovery (CDR) circuit 320, and a controller CTRL 330.

The equalizer set 310 may include a first equalizer EQZ1 311 and a second equalizer EQZ2 312. The first equalizer EQZ1 311 may equalize data received from the transmitter to generate a first equalization signal EQF. The first equalizer EQZ1 311 may receive a data signal DAT. The first equalizer EQZ1 311 may perform equalization on the data signal DAT based on a first control code CTR1 in a frequency domain. For example, the first equalizer EQZ1 311 may be a continuous time linear equalizer (CTLE).

In an embodiment, the first equalizer EQZ1 311 may remove an influence of a post-cursor corresponding to a long tail of the data signal DAT. The post-cursor is a cursor positioned temporally behind a main cursor, which is current data sampled at a sampling time. For example, the first equalizer EQZ1 311 may remove an influence of one post-cursor positioned between +1 UI to +1.5 UI with respect to the main cursor.

According to some embodiments, the first equalizer EQZ1 311 may further remove an influence of a pre-cursor. The pre-cursor is a cursor positioned temporally ahead of the main cursor. For example, the first equalizer EQZ1 311 may remove the influence of the pre-cursor positioned at −1 UI with respect to the main cursor. The operation of the first equalizer EQZ1 311 will be described below with reference to FIGS. 5 to 10.

The second equalizer EQZ2 312 may equalize the first equalization signal EQF to generate a second equalization signal EQS. The second equalizer EQZ2 312 may perform equalization based on a second control code CTR2 in a time domain. For example, the second equalizer EQZ2 312 may be a decision feedback equalizer (DFE).

The second equalizer EQZ2 312 may remove the influence of the post-cursor of the first equalization signal EQF. The second equalizer EQZ2 312 includes g DFE sets, and the second equalizer EQZ2 312 may be expressed as a g-tap equalizer. Here, g represents the number of taps of the second equalizer EQZ2 312 and may be an integer greater than 1. One DFE set may include a data equalizer and an edge equalizer. The second equalizer EQZ2 312 may remove the influence of post-cursors of +2 UI to +g UI with respect to the main cursor. That is, the second equalizer EQZ2 312 may remove influences of the remaining post-cursors that are not processed by the first equalizer 311.

The second equalizer EQZ2 312 may include a data equalizer, an edge equalizer, an error sampler, a digital-analog converter (DAC), etc. The data equalizer may be synchronized with the data clock signal to equalize the first equalization signal EQF and output data bits. The edge equalizer may be synchronized with the edge clock signal to equalize the first equalization signal EQF and output edge bits. The error sampler may use a specific clock signal to sample the first equalization signal EQF and generate an error value used for adaptive equalization. The DAC may generate an analog signal based on the second control code CTR2 and output the analog signal to each of the data equalizer, the edge equalizer, and the error sampler. The operation of the second equalizer EQZ2 312 will be described below with reference to FIGS. 11 to 15.

Although not particularly indicated in FIG. 4, the first equalizer EQZ1 311 and the second equalizer EQZ2 312 may receive differential signals. That is, the first equalizer EQZ1 311 and the second equalizer EQZ2 312 may receive an input signal and a complementary signal (e.g., an inverted signal) of the input signal. The first equalizer EQZ1 311 may receive a complementary signal of the data signal DAT together with the data signal DAT. The complementary signal of the data signal DAT may be expressed as/DAT. The first equalizer EQZ1 311 may perform equalization on the data signal DAT and the complementary signal/DAT to generate the first equalization signal EQF and a complementary signal of the first equalization signal EQF. Similarly, the complementary signal of the first equalization signal EQF may be expressed as/EQF. The second equalizer EQZ2 312 may perform equalization on the first equalization signal EQF and the complementary signal/EQF to generate the second equalization signal EQS.

The CDR circuit 320 may restore a clock signal CLK by using the second equalization signal EQS and output the restored clock signal CLK. The CDR circuit 320 may fix the restored clock signal CLK. The restored clock signal CLK may include a data clock signal and an edge clock signal. The CDR circuit 320 may output the restored clock signal CLK to the second equalizer EQZ2 312. That is, the CDR circuit 320 may output the data clock signal to the data equalizer of the second equalizer EQZ2 312 and output the edge clock signal to the edge equalizer of the second equalizer EQZ2 312.

The CDR circuit 320 may be implemented to include a component searching for and fixing a phase and a frequency of the clock signal through a feedback loop such as a phase-locked loop (PLL) or a delay-locked loop (DLL). The CDR circuit 320 may include a phase detector for restoring the clock signal CLK. The CDR circuit 320 may deserialize the second equalization signal EQS to output obtained signals DSD, DSE, and DSR to the controller CTRL 330. An operation of the CDR circuit 320 will be described below with reference to FIG. 16.

The controller CTRL 330 may generate and adjust the first control code CTR1 and the second control code CTR2 based on the deserialized signals DSD, DSE, and DSR. For example, the controller CTRL 330 may perform an operation on the data bits DSD, the edge bits DSE, and the error bit DSR in units of bits to generate an accumulation value. The controller CTRL 330 may use a sign-sign least mean square (SSLMS) algorithm on the data bits DSD, the edge bits DSE, and the error bit DSR. In other words, the controller CTRL 330 may apply the SSLMS to the data bits DSD, the edge bits DSE, and the error bit DSR. The controller CTRL 330 may accumulate SSLMS operation result values to generate an accumulation value. The controller CTRL 330 may adjust the first control code CTR1 and the second control code CTR2 based on the accumulation value. The operation of the controller CTRL 330 will be described below with reference to FIGS. 17 to 28.

According to some embodiments, the receiver 300 may further include an eye margin test (EMT) circuit for measuring a timing margin of the receiver 300. The EMT circuit may measure whether the eye diagram is optimally open. After equalization of the receiver 300 is completed, the EMT circuit may apply noise to the clock signal CLK. The EMT circuit may measure a bit error generated according to a phase adjustment of the clock signal CLK. For example, the EMT circuit may detect the bit error from the data bits DSD and the edge bits DSE received while applying noise to the clock signal CLK. The EMT circuit may measure a margin based on a degree of phase adjustment of the clock signal CLK at the time when the bit error is detected. The EMT circuit may output a third control code to the CDR circuit 320 according to the margin. The CDR circuit 320 may adjust the clock signal CLK based on the third control code. An example of a configuration and function of the EMT circuit is described in US Patent Application Publication No. 2023/0143912, which is herein incorporated by reference.

Figure 5:
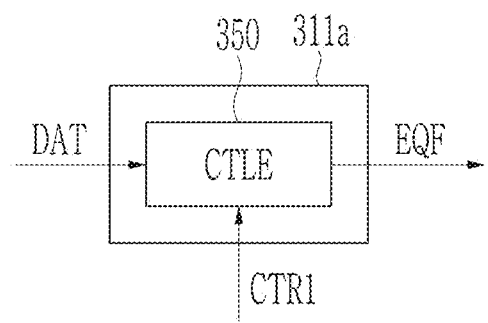
FIG. 5 is a block diagram of a first equalizer according to some embodiments.
Figure 6:
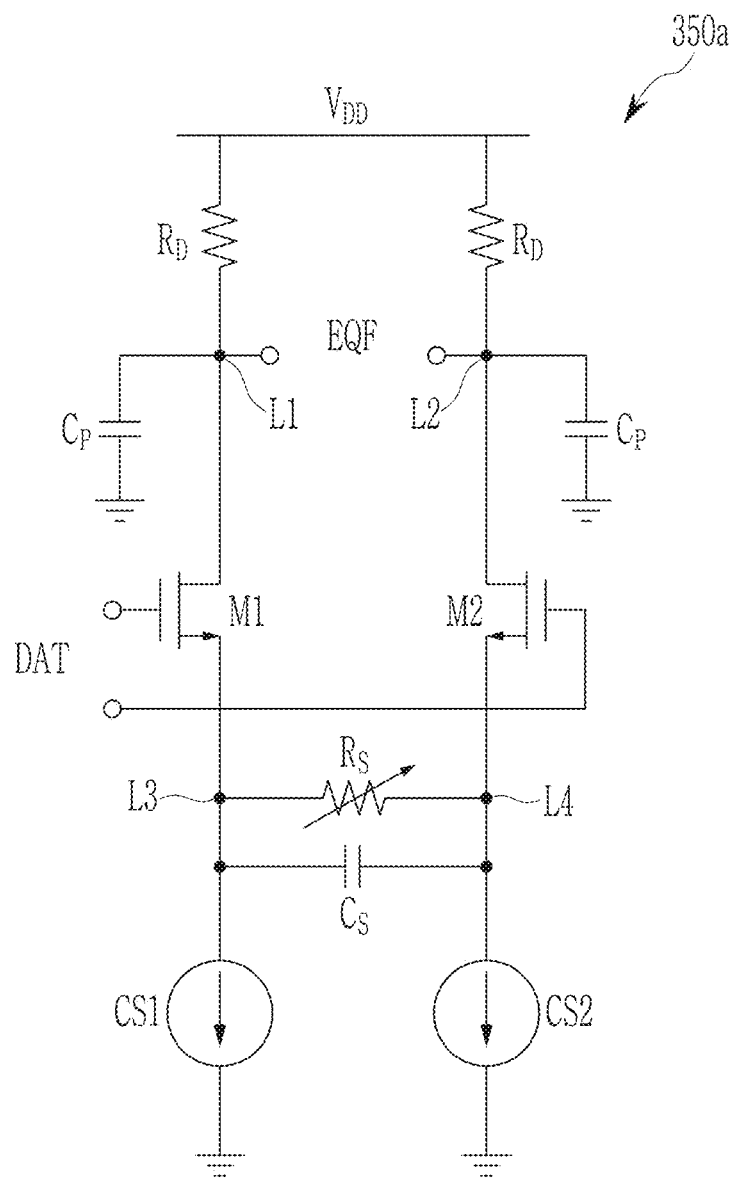
FIG. 6 is a circuit diagram of a continuous time linear equalizer according to some embodiments.
Figure 7:
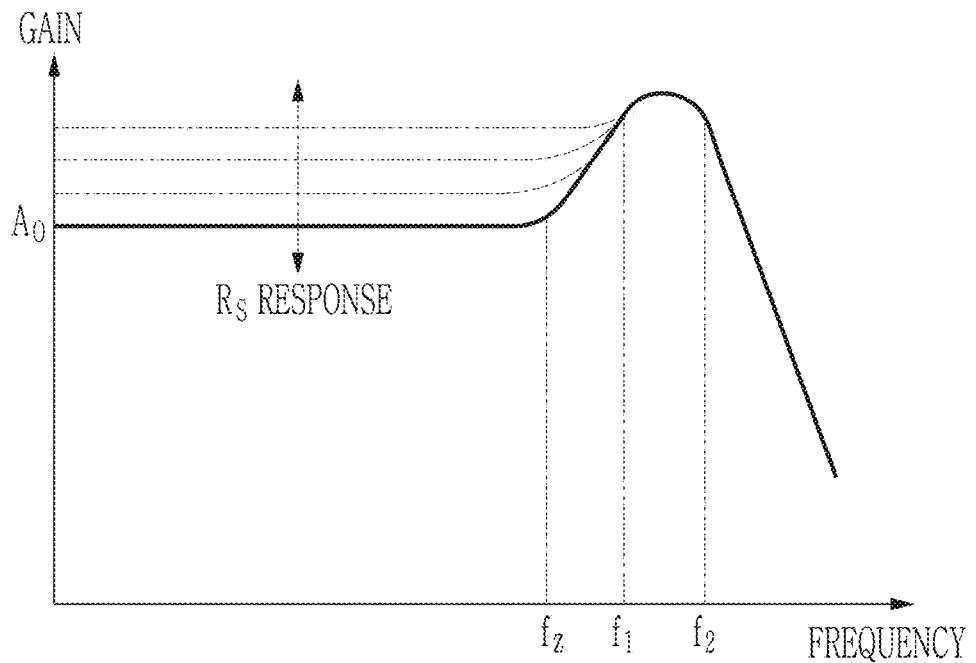
FIG. 7 is a graph illustrating a frequency response of a first equalizer according to an equalized state, according to some embodiments.

FIG. 5 is a block diagram of a first equalizer according to some embodiments. FIG. 6 is a circuit diagram of a CTLE according to some embodiments. FIG. 7 is a graph illustrating a frequency response of the first equalizer according to an equalized state, according to some embodiments.

Referring to FIG. 5, a first equalizer 311a according to some embodiments may include a continuous time linear equalizer (CTLE) 350. The CTLE 350 may equalize the data signal DAT based on the first control code CTR1 to generate the first equalization signal EQF. For example, the CTLE 350 may equalize the data signal DAT such that a DC gain increases when the first control code CTR1 increases, and may equalize the data signal DAT such that the DC gain decreases when the first control code CTR1 decreases. The first equalization signal EQF may be a signal obtained by removing an influence of a pre-cursor and/or a post-cursor from the data signal DAT. For example, the first equalizer 311a may remove an influence of one post-cursor positioned between +1 UI to +1.5 UI with respect to a main cursor. According to some embodiments, the first equalizer 311a may remove the influence of the pre-cursor of −1 UI with respect to the main cursor.

Referring to FIG. 6, the CTLE 350a according to some embodiments may be implemented as at least one frequency-dependent source-degeneration type amplifier. The configuration of the CTLE 350a may be suitable for one-dimensional control of an equalization strength.

The CTLE 350a includes a pair of transistors M1 and M2 each connected to a power voltage $V_{DD}$ through a resistor $R_D$ and grounded respectively through current sources CS1 and CS2. The resistor $R_D$, a capacitor $C_P$, and the transistor M1 may be connected at a node L1, and the resistor $R_D$, the capacitor $C_P$, and the transistor M2 may be connected at a node L2. The CTLE 350a may output the first equalization signal EQF through the nodes L1 and L2.

The transistors M1 and M2 may be connected through a variable resistor array $R_S$ and through a variable capacitor array $C_S$, with the variable resistor array $R_S$ and the variable capacitor array $C_S$ connected to each other in parallel. The transistor M1, the variable resistor array $R_S$, the variable capacitor array $C_S$, and a current source CS1 may be connected at a node L3, and the transistor M2, the variable resistor array $R_S$, the variable capacitor array $C_S$, and a current source CS2 may be connected at a node L4. The CTLE 350a may receive the data signal DAT through the nodes L3 and L4.

The variable resistor array $R_S$ may include a plurality of resistors, the plurality of resistors may be connected to each other in parallel by switches, and the switches may be respectively connected in series to the resistors. Opening and closing of the switches included in the variable resistor array $R_S$ may be controlled by a digital value of the first control code CTR1 described above.

The variable capacitor array $C_S$ may include a plurality of capacitors, these capacitors may be connected to each other in parallel by switches, and the switches may be respectively connected in series to the capacitors. Likewise, opening and closing of the switches included in the variable capacitor array $C_S$ may be controlled by the digital value of the first control code CTR1.

A resistance value of resistor $R_D$, a resistance value of variable resistor array $R_S$, and a capacitance of variable capacitor array $C_S$ may determine the DC gain, a position of a pole, and a zero position of the CTLE 350a.

Referring to FIG. 7 together with FIGS. 5-6, it may be seen how an equalizer gain or an equalization strength adaptively changes according to an equalized state determined by the CTLE 350a. In FIG. 7, the horizontal axis represents frequency and the vertical axis represents the equalizer gain. The CTLE 350a has the characteristics defined by Equation (1).

$$A_O = R_D/R_S$$

$$f_Z = 1/(C_S * R_S)$$

$$f_1 = gm/C_S$$

$$f_2 = 1/(C_S * R_D) \quad \text{(Equation 1)}$$

Here, $A_O$ denotes the DC gain of the CTLE 350a, $f_Z$ denotes the zero position of CTLE 350a, $f_1$ and $f_2$ denote pole positions of the CTLE 350a, and gm denotes a transconductance of the transistors M1 and M2.

The zero position $f_Z$ determines a frequency band boosted by an amplifier stage, and the DC gain $A_O$ controls the equalization strength. When a data rate is determined, the zero position $f_Z$ may be set through a manual control or through an automatic band selection circuit. The above-described controller 330 may adjust the DC gain $A_O$ through an adjustment of the first control code CTR1, thereby obtaining the maximum eye opening in a non-return to zero (NRZ) data pattern.

The CTLE 350a may control the DC gain $A_O$ by adjusting the resistance value of the variable resistor array $R_S$ based on the first control code CTR1. The variable resistor array $R_S$ may have a resistance response $R_S$ RESPONSE (as shown in FIG. 7) in which the DC gain $A_O$ decreases due to a decrease in the first control code CTR1. For example, switches in the variable resistor array $R_S$ may be configured to increase a resistance value when the first control code CTR1 decreases, thereby reducing the DC gain $A_O$.

The variable resistor array $R_S$ may have the resistance response $R_S$ RESPONSE in which the DC gain $A_O$ increases due to an increase in the first control code CTR1. For example, the switches in the variable resistor array $R_S$ may be configured to increase the resistance value when the first control code CTR1 increases, thereby increasing the DC gain $A_O$.

Figure 8:
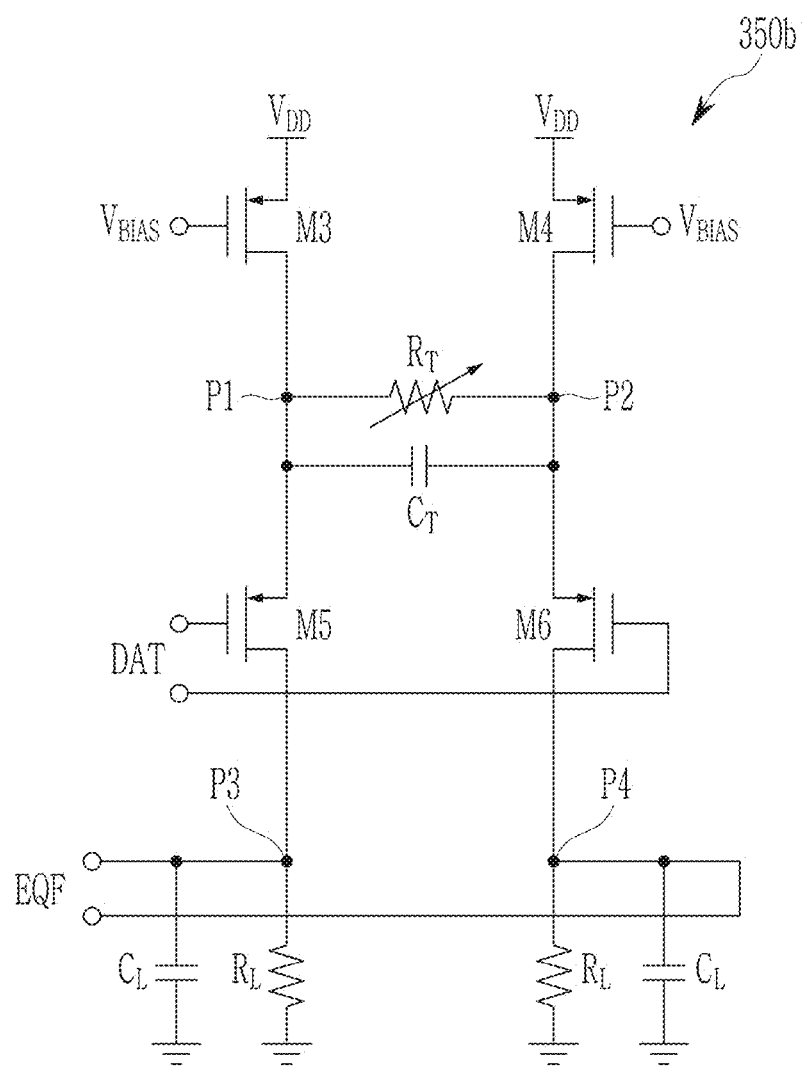
FIG. 8 is a circuit diagram of a continuous time linear equalizer according to some embodiments.

FIG. 8 is a circuit diagram of a CTLE according to some embodiments.

Referring to FIG. 8, a CTLE 350b according to some embodiments may be implemented as at least one source-degeneration type amplifier.

The CTLE 350*b* includes a pair of transistors M5 and M6 connected to the power voltage $V_{DD}$ through the transistors M3 and M4 respectively and grounded through a resistor $R_L$ and a capacitor $C_L$, respectively. The transistors M3 and M5, a variable resistor array $R_T$, and a variable capacitor array $C_T$ may be connected at a node P1, and the transistors M4 and M6, the variable resistor array $R_T$, and the variable capacitor array $C_T$ may be connected at a node P2. The transistors M3 and M4 may receive a bias voltage $V_{BIAS}$ through gates thereof. The transistors M5 and M6 may receive the data signal DAT through gates thereof and output the first equalization signal EQF through drains thereof. The drains of transistors M5 and M6 may be connected to the resistor $R_L$ and the capacitor $C_L$ at the nodes P3 and P4.

The variable resistor array $R_T$ includes a plurality of resistors, the plurality of resistors may be connected to each other in parallel by switches, and the switches may be respectively connected to the resistors in series. Opening and closing of the switches included in the variable resistor array $R_T$ may be controlled by a digital value of the first control code CTR1 described above.

The variable capacitor array $C_T$ includes a plurality of capacitors, the plurality of capacitors may be connected to each other in parallel by switches, and the switches may be respectively connected to the capacitors in series. Likewise, opening and closing of the switches included in the variable capacitor array $C_T$ may be controlled by the digital value of the first control code CTR1.

A resistance value of the resistor $R_L$, a capacitance of the capacitor $C_L$, a resistance value of the variable resistor array $R_T$, and a capacitance of the variable capacitor array $C_T$ may determine a DC gain, a position of a pole, and a zero position of the CTLE 350*b*.

Figure 9:
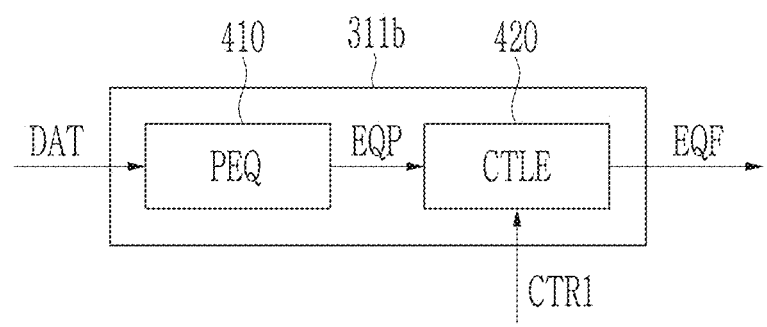
FIG. 9 is a block diagram of a first equalizer according to some embodiments.
Figure 10:
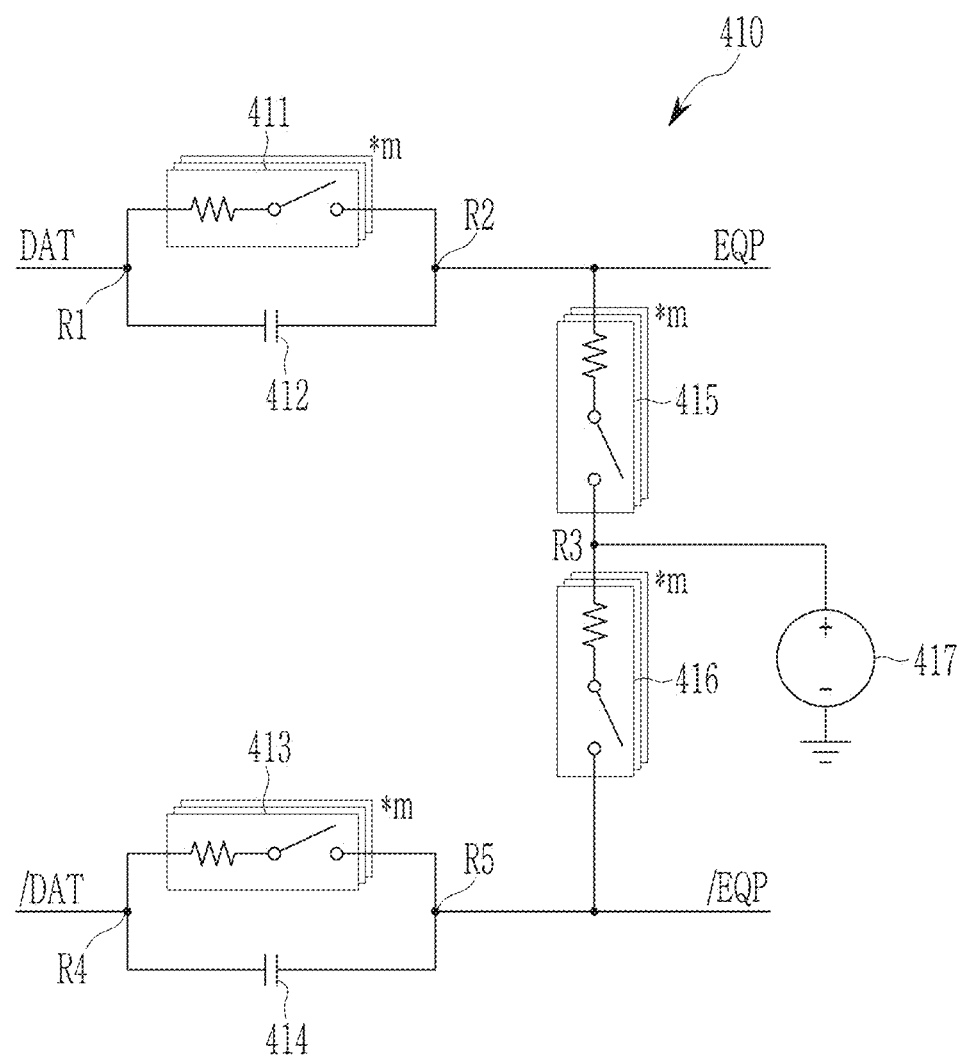
FIG. 10 is a circuit diagram of a passive equalizer according to some embodiments.

FIG. 9 is a block diagram of a first equalizer according to some embodiments. FIG. 10 is circuit diagram of a passive equalizer according to some embodiments.

Referring to FIG. 9, a first equalizer 311*b* according to some embodiments may include a passive equalizer PEQ 410 and a CTLE 420. The passive equalizer PEQ 410 may receive the data signal DAT. The passive equalizer PEQ 410 may output a signal EQP by performing boosting on the data signal DAT in a frequency domain so as to compensate for loss of the data signal DAT. The passive equalizer PEQ 410 may include a series/parallel combination of a resistor and a capacitor.

The CTLE 420 may equalize the signal EQP based on the first control code CTR1 to generate the first equalization signal EQF. For example, the CTLE 420 may equalize the signal EQP such that a DC gain increases when the first control code CTR1 increases, and may equalize the signal EQP such that the DC gain decreases when the first control code CTR1 decreases. The description of the CTLE described with reference to FIGS. 5 to 8 may be equally applied to the CTLE 420. That is, the CTLE 420 may be the CTLE 350*a* or the CTLE 350*b* described above.

Referring to FIG. 10, the passive equalizer PEQ 410 according to some embodiments may include a plurality of resistance-switch combinations 411, 413, 415, and 416, capacitors 412 and 414, and a voltage source 417. The passive equalizer PEQ 410 may tune the data signal DAT by controlling opening and closing of switches of the plurality of resistance-switch combinations 411, 413, 415, and 416. Each of the resistance-switch combinations 411, 413, 415, and 416 may be implemented in m numbers and connected to each other in parallel. Here, m may be an integer greater than 1.

The resistor-switch combination 411 and the capacitor 412 may be connected to each other in parallel between a node R1 and a node R2. The data signal DAT may be input to the node R1, and the signal EQP may be output from the node R2.

The resistance-switch combination 415 and the resistance-switch combination 416 may be connected to each other in series between the node R2 and a node R5. In detail, the resistance-switch combination 415 may be connected between the node R2 and a node R3, and the resistance-switch combination 416 may be connected between the node R3 and the node R5. The voltage source 417 may be connected to the resistor-switch combination 415 and the resistor-switch combination 416 at the node R3. That is, the voltage source 417 may supply voltage to the resistor-switch combinations 415 and 416 through the node R3.

The resistor-switch combination 413 and the capacitor 414 may be connected to each other in parallel between a node R4 and the node R5. A complementary signal/DAT may be input to the node R4, and a complementary signal/EQP may be output from the node R5.

Figure 11:
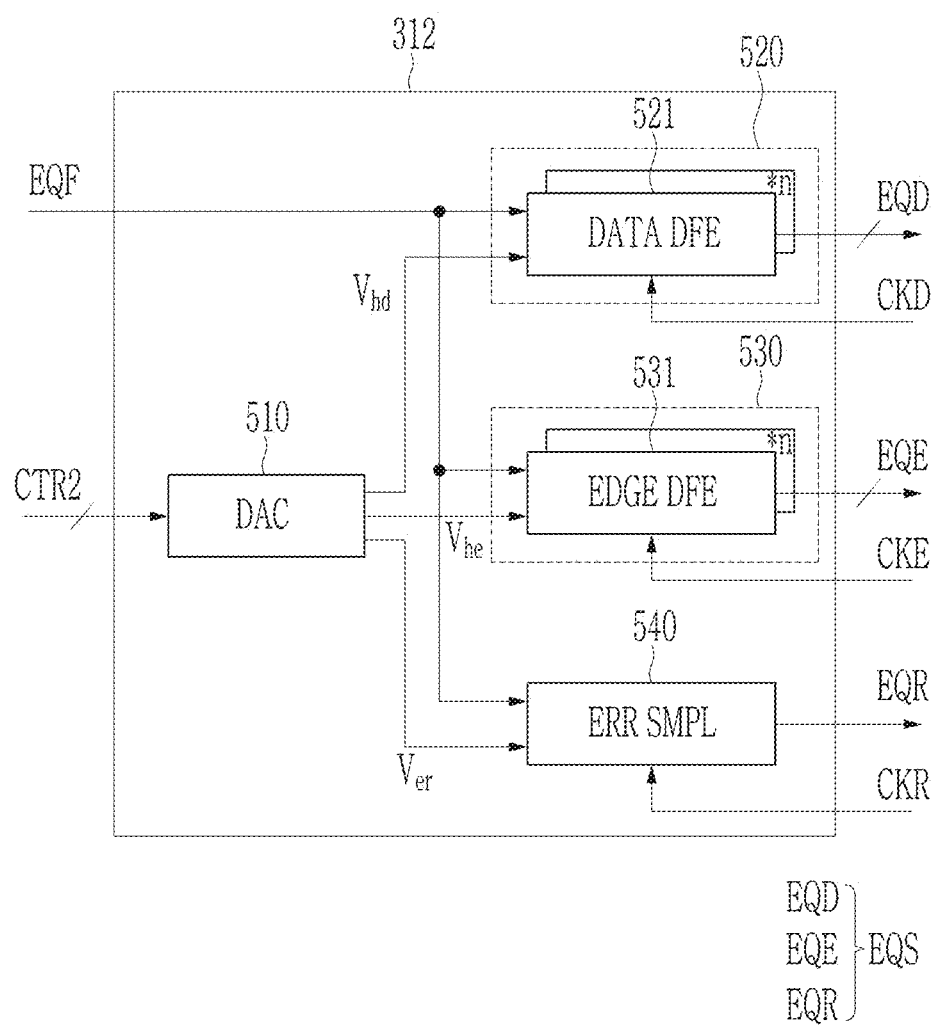
FIG. 11 is a block diagram of a second equalizer according to some embodiments.
Figure 12:
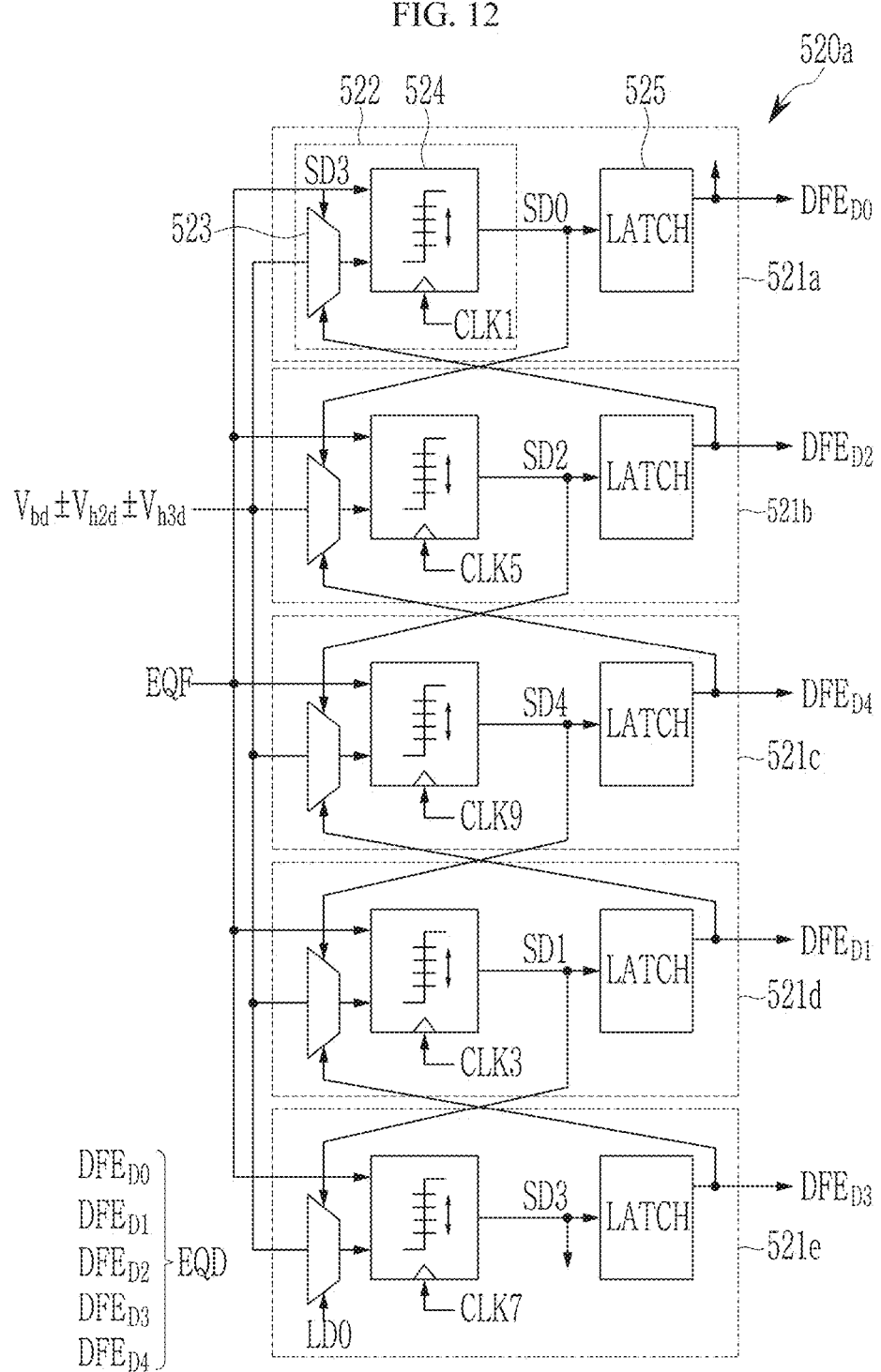
FIG. 12 is a block diagram of a data equalizer according to some embodiments.
Figure 13:
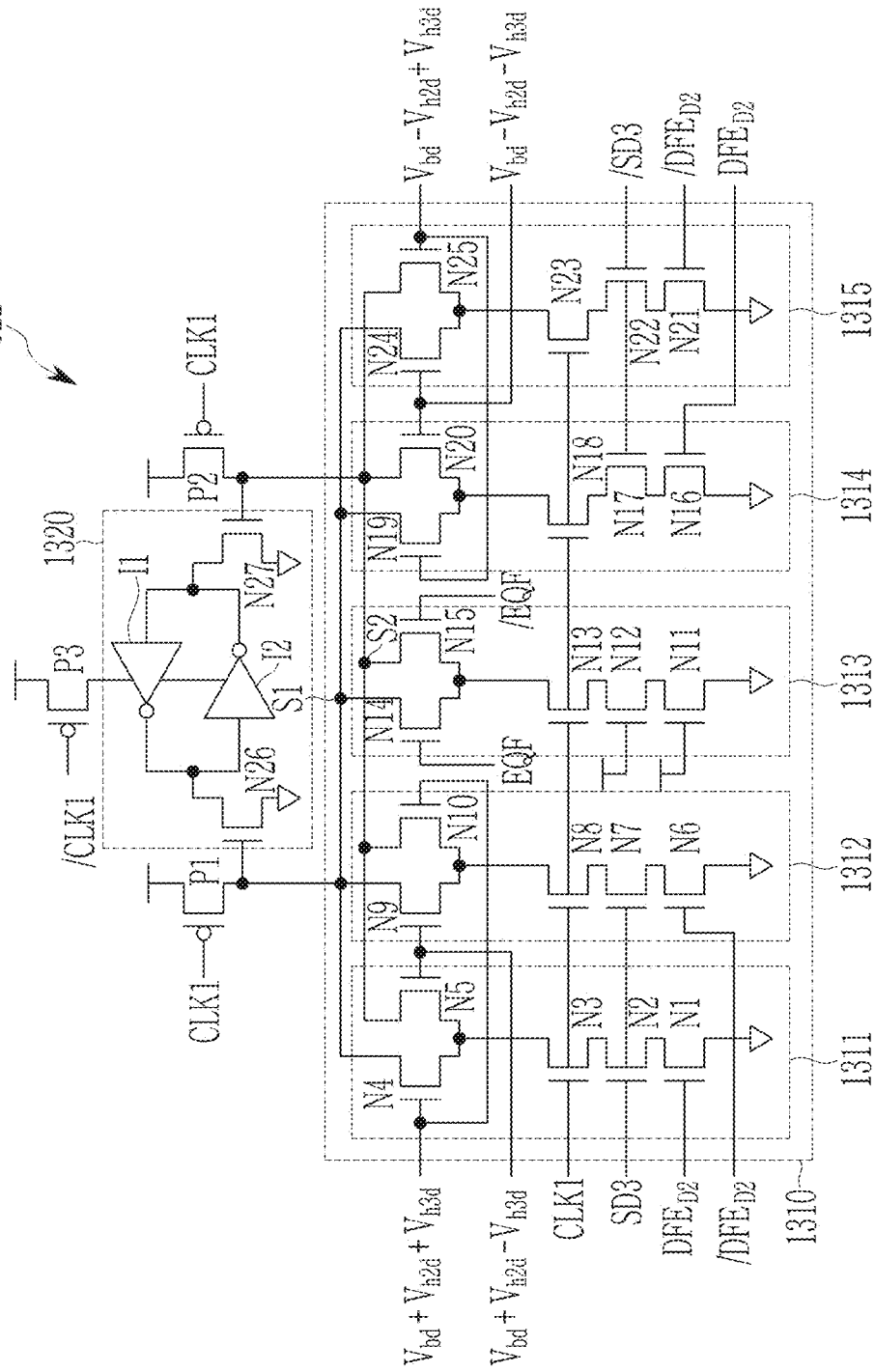
FIG. 13 is a circuit diagram of a data equalization cell according to some embodiments.
Figure 14:
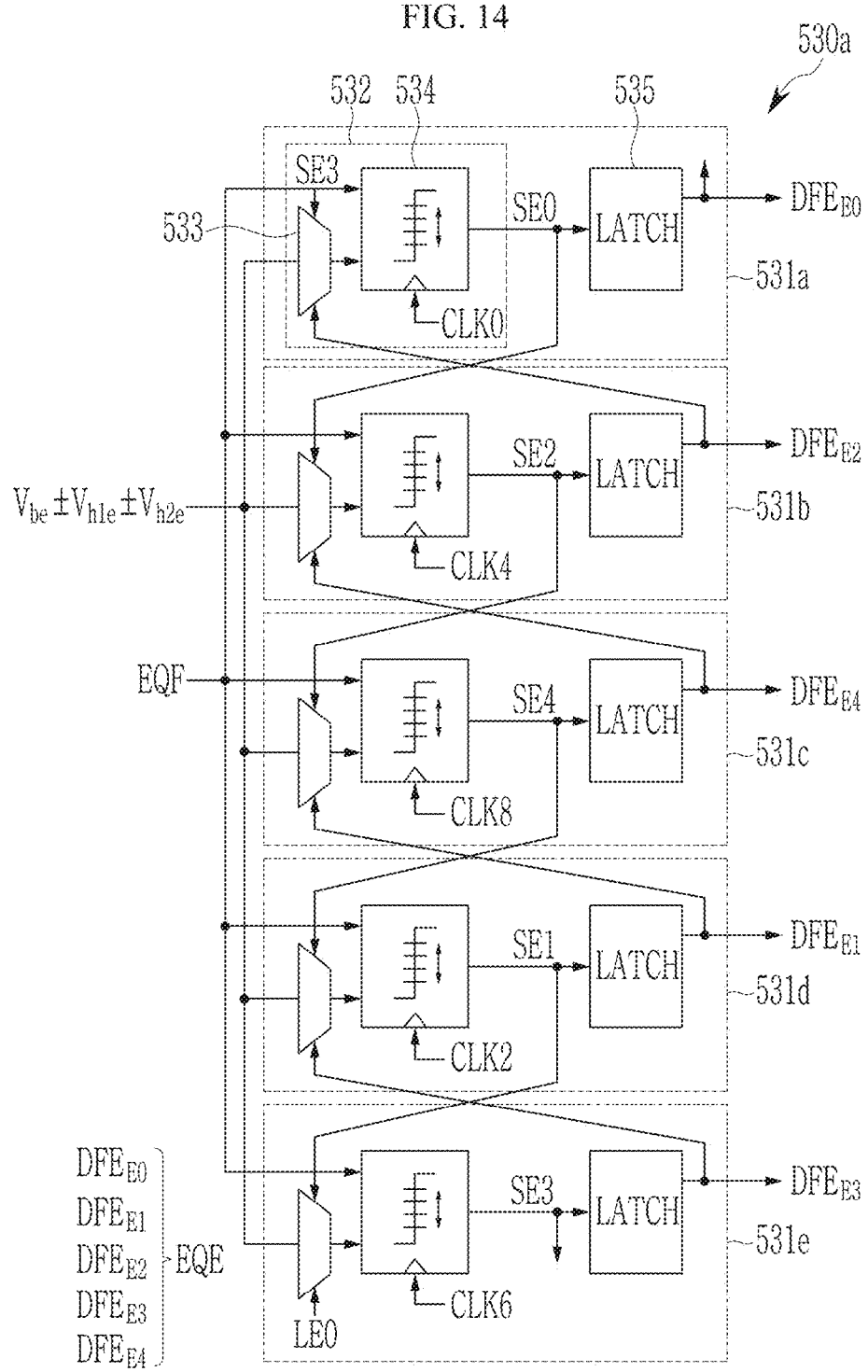
FIG. 14 is a block diagram of an edge equalizer according to some embodiments.
Figure 15:
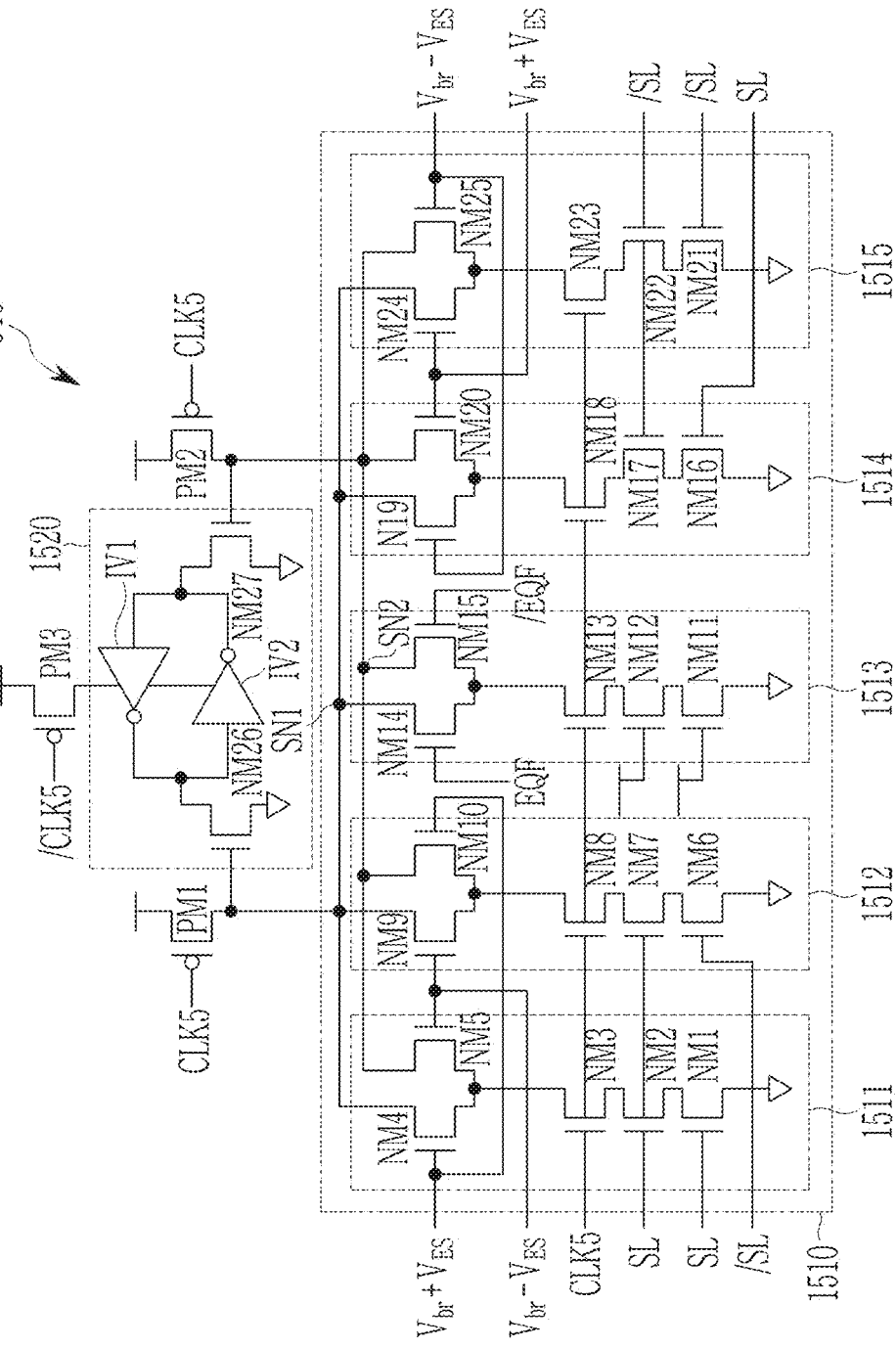
FIG. 15 is a circuit diagram of an error sampler according to some embodiments.

FIG. 11 is a block diagram of a second equalizer according to some embodiments. FIG. 12 is a block diagram of a data equalizer according to some embodiments. FIG. 13 is a circuit diagram of a data equalization cell according to some embodiments. FIG. 14 is a block diagram of an edge equalizer according to some embodiments. FIG. 15 is a circuit diagram of an error sampler according to some embodiments.

Referring to FIG. 11, the second equalizer 312 according to some embodiments may equalize the first equalization signal EQF based on the second control code CTR2 to generate the second equalization signal EQS. The second equalization signal EQS may include a plurality of data bits EQD, a plurality of edge bits EQE, and the error bit DSR. The second equalizer 312 may equalize the first equalization signal EQF in a time domain. The second equalizer 312 may remove an influence of a post-cursor of the first equalization signal EQF. For example, when the second equalizer 312 is a g-tap equalizer (g is an integer greater than 1), the second equalizer 312 may remove influences of post-cursors of +2 UI to +g UI.

The second equalizer 312 may include a digital-to-analog converter DAC 510, a plurality of data equalizers DATA DFE 520, a plurality of edge equalizers EDGE DFE 530, and an error sampler ERR SMPL 540. The plurality of data equalizers DATA DFE 520 may include n data equalizers 521, and the plurality of edge equalizers EDGE DFE 530 may include n edge equalizers 531. Here, n may be an integer greater than 1. In some embodiments, n may be related to a rate of a clock signal output from the CDR circuit 320 of FIG. 4. For example, the CDR circuit 320 of FIG. 4 may output clock signals of 1/n rate. The plurality of data equalizers DATA DFE 520 and the plurality of edge equalizers EDGE DFE 530 may be configured as decision feedback equalizers (DFEs).

The data equalizer DATA DFE 521 may be synchronized with the data clock signal CKD to equalize the first equalization signal EQF and output the data bits EQD. The data clock signal CKD may be output from the CDR circuit 320 of FIG. 4 and may include clock signals of 1/n rate. In this regard, the DAC 510 may output a first voltage $V_{hd}$ corresponding to the second control code CTR2 to the data equalizer 521. The data equalizer 521 may equalize the first equalization signal EQF based on the first voltage $V_{hd}$ of the DAC 510.

The edge equalizer EDGE DFE 531 may be synchronized with an edge clock signal CKE to equalize the first equalization signal EQF and output the edge bits EQE. The edge clock signal CKE may be output from the CDR circuit 320 of FIG. 4 and may include clock signals of 1/n rate. In some embodiments, there may be a time interval of 0.5 UI between the data clock signal CKD and the edge clock signal CKE. In this regard, the DAC 510 may output a second voltage $V_{he}$ corresponding to the second control code CTR2 to the edge equalizer 531. The edge equalizer 531 may equalize the first equalization signal EQF based on the second voltage $V_{he}$ of the DAC 510.

The error sampler ERR SMPL 540 may operate to provide a reference point for the data equalizer 521 and the edge equalizer 531 to measure an amplitude of the first equalization signal EQF. The error sampler 540 may be synchronized with an error clock signal CKR to sample the first equalization signal EQF and output an error value EQR. The error clock signal CKR may be output from the CDR circuit 320 of FIG. 4. At this time, the DAC 510 may output a third voltage $V_{er}$ corresponding to the second control code CTR2 to the error sampler 540. The error sampler 540 may sample the first equalization signal EQF based on the third voltage $V_{er}$ of the DAC 510.

The controller CTRL 330 of FIG. 4 may adjust a reference point based on the error value EQR that is a sampling result of the error sampler 540. That is, the controller 330 may initially provide the second control code CTR2 so that the data equalizer 521 and the edge equalizer 531 measure the amplitude with respect to 0 V. Then, when the error sampler 540 outputs the error value EQR based on the third voltage $V_{er}$ and the second equalizer 312 completes adaptation based on the error value EQR, the data equalizer 521 and the edge equalizer 531 may perform equalization based on a reference value set by the controller 330. Adaptation may be understood as a process of bringing the second equalizer 312 into a good equalized state.

In an embodiment, the error clock signal CKR may be a middle clock signal among clock signals of 1/n rate included in the clock signal CKD. For example, when n is 5 and the clock signal CKD includes first to fifth clock signals, the error clock signal CKR may correspond to the third clock signal.

Referring to FIG. 12, a plurality of data equalizers 520a according to some embodiments may equalize the first equalization signal EQF based on data clock signals CLK1, CLK3, CLK5, CLK7, and CLK9 to obtain the data bits EQD. The data bits EQD may include data bits $DFE_{D0}$ to $DFE_{D4}$. The plurality of data equalizers 520a may include a first data equalizer 521a, a second data equalizer 521b, a third data equalizer 521c, a fourth data equalizer 521d, and a fifth data equalizer 521e. The first to fifth data equalizers 521a to 521e may respectively output the data bits $DFE_{D0}$ to $DFE_{D4}$. The first to fifth data equalizers 521a to 521e may have the same structure, and a clock signal input to a sampler, a select signal input to a multiplexer, and resulting output signals may be different in the first to fifth data equalizers 521a to 521e. The select signal may be a signal that one data equalizer among the plurality of data equalizers 520a outputs to another data equalizer. As a result, only the first data equalizer 521a will be described below, and the same description may be applied to the second to fifth data equalizers 521b to 521e.

The first data equalizer 521a may equalize the first equalization signal EQF based on the data clock signal CLK1 and output the data bit $DFE_{D0}$. The first data equalizer 521a may include an equalization cell 522 and a latch 525. The equalization cell 522 may include a multiplexer 523 and a sampler 524.

The multiplexer 523 may receive a voltage $V_{bd} \pm V_{h2d} \pm V_{h3d}$ corresponding to the second control code CTR2 from the DAC 510 in FIG. 11. The voltage $V_{bd} \pm V_{h2d} \pm V_{h3d}$ may correspond to the first voltage $V_{hd}$ in FIG. 11. The voltage $V_{bd}$ may be a bias voltage of the first data equalizer 521a, the voltage $V_{h2d}$ and $V_{h3d}$ may be a voltage for tuning the bias voltage. The magnitudes of the voltage $V_{h2d}$ and $V_{h3d}$ may be controlled by the second control code CTR2. The voltage $V_{bd} \pm V_{h2d} \pm V_{h3d}$ includes a voltage $V_{bd} + V_{h2d} + V_{h3d}$, a voltage $V_{bd} + V_{h2d} - V_{h3d}$, a voltage $V_{bd} - V_{h2d} + V_{h3d}$, and a voltage $V_{bd} - V_{h2d} - V_{h3d}$, and the voltage $V_{bd} + V_{h2d} + V_{h3d}$, the voltage $V_{bd} + V_{h2d} - V_{h3d}$, the voltage $V_{bd} - V_{h2d} + V_{h3d}$, and the voltage $V_{bd} - V_{h2d} - V_{h3d}$ may be applied to the multiplexer 523.

The multiplexer 523 may receive select signals SD3 and $DFE_{D2}$. For example, the second data equalizer 521b may output the select signal $DFE_{D2}$, and the fifth data equalizer 521e may output the select signal SD3. The multiplexer 523 may select two voltages from among the voltage $V_{bd} \pm V_{h2d} \pm V_{h3d}$ according to the select signals SD3 and $DFE_{D2}$.

The sampler 524 may use the two selected voltages as reference voltages. The sampler 524 may sample the first equalization signal EQF based on the data clock signal CLK1. The sampler 524 may sample the first equalization signal EQF when a logic level of the data clock signal CLK1 transitions. For example, the sampler 524 may output a first value when the first equalization signal EQF is higher than the reference voltage, and output a second value when the first equalization signal EQF is lower than the reference voltage. An output of the sampler 524 may be input to a multiplexer of the second data equalizer 521b as a select signal SD0. The output of the sampler 524 may be input to a latch 525.

In some embodiments, the latch 525 may be an SR latch. The latch 525 may latch the output of the sampler 524. The latch 525 may output latched data as the data bit $DFE_{D0}$. The data bit $DFE_{D0}$ may be input to a multiplexer of the fifth data equalizer 521e as a select signal. The data bit $DFE_{D0}$ may be input to a CDR circuit.

Referring to FIG. 13, an equalization cell 522 according to some embodiments may include a differential input circuit 1310 and an amplification circuit 1320. The differential input circuit 1310 may include a first receiving circuit 1311, a second receiving circuit 1312, a third receiving circuit 1313, a fourth receiving circuit 1314, and a fifth receiving circuit 1315. The first receiving circuit 1311, the second receiving circuit 1312, the fourth receiving circuit 1314, and the fifth receiving circuit 1315 are tap receiving circuits, and the respective receiving circuits may have different input voltage levels. For example, the first receiving circuit 1311 and the second receiving circuit 1312 may receive the voltages $V_{bd} + V_{h2d} + V_{h3d}$ and the voltages $V_{bd} + V_{h2d} - V_{h3d}$, and the fourth receiving circuit 1314 and the fifth receiving circuit 1315 may receive the voltage $V_{bd} - V_{h2d} + V_{h3d}$ and the voltage $V_{bd} - V_{h2d} - V_{h3d}$. The third receiving circuit 1313 may be an input signal (i.e., the first equalization signal EQF) receiving circuit.

The equalization cell 522 may select one of tap receiving circuits according to the select signals SD3, $DFE_{D2}$, /SD3, and/$DFE_{D2}$. For example, the equalization cell 522 may turn on a receiving circuit to which the select signals SD3, $DFE_{D2}$, /SD3, and/$DFE_{D2}$ are all input at a high level and turn off the remaining receiving circuits among the tap receiving circuits. The select signals SD3, $DFE_{D2}$, /SD3, and/$DFE_{D2}$ input to the remaining receiving circuits may have low levels. That is, the tap receiving circuit of the equalization cell 522 may be turned on or off according to the select signals SD3, $DFE_{D2}$, /SD3, and/$DFE_{D2}$.

The equalization cell 522 may receive the first equalization signal EQF and the complementary signal/EQF, which are differential signals, through the third receiving circuit 1313. The voltage $V_{bd} \pm V_{h2d} \pm V_{h3d}$ input to the first receiving circuit 1311, the second receiving circuit 1312, the fourth receiving circuit 1314, and the fifth receiving circuit 1315 may be used as a reference voltage. The tap receiving circuit selected according to the select signals SD3, $DFE_{D2}$, /SD3, and/$DFE_{D2}$ in the equalization cell 522 may sample the first equalization signal EQF and the complementary signal/EQF by using the reference voltage, and output a sampling result to the amplification circuit 1320.

The first receiving circuit 1311 may include first to fifth NMOS transistors N1 to N5. The first NMOS transistor N1 may receive the select signal $DFE_{D2}$, the second NMOS transistor N2 may receive the select signal SD3, and the third NMOS transistor N3 may receive the data clock signal CLK1. The fourth NMOS transistor N4 may receive the voltage $V_{bd} + V_{h2d} + V_{h3d}$, and the fifth NMOS transistor N5 may receive the voltage $V_{bd} + V_{h2d} - V_{h3d}$.

The second receiving circuit 1312 may include sixth to tenth NMOS transistors N6 to N10. The sixth NMOS transistor N6 may receive the select signal/$DFE_{D2}$, the seventh NMOS transistor N7 may receive the select signal SD3, and the eighth NMOS transistor N8 may receive the data clock signal CLK1. The ninth NMOS transistor N9 may receive the voltage $V_{bd} + V_{h2d} - V_{h3d}$, and the tenth NMOS transistor N10 may receive the voltage $V_{bd} + V_{h2d} + V_{h3d}$.

The third receiving circuit 1313 may include eleventh to fifteenth NMOS transistors N11 to N15. The eleventh and twelfth NMOS transistors N11 and N12 may receive a power voltage, and the thirteenth NMOS transistor N13 may receive the data clock signal CLK1. The fourteenth NMOS transistor N14 may receive the first equalization signal EQF, and the fifteenth NMOS transistor N15 may receive the complementary signal/EQF.

The fourth receiving circuit 1314 may include sixteenth to twentieth NMOS transistors N16 to N20. The sixteenth NMOS transistor N16 may receive the select signal $DFE_{D2}$, the seventeenth NMOS transistor N17 may receive the select signal/SD3, and the eighteenth NMOS transistor N18 may receive the data clock signal CLK1. The nineteenth NMOS transistor N19 may receive the voltage $V_{bd} - V_{h2d} + V_{h3d}$, and the twentieth NMOS transistor N20 may receive the $V_{bd} - V_{h2d} - V_{h3d}$.

The fifth receiving circuit 1315 may include twenty-first to twenty-fifth NMOS transistors N21 to N25. The twenty-first NMOS transistor N21 may receive the select signal /$DFE_{D2}$, the twenty-second NMOS transistor N22 may receive the select signal /SD3, and the twenty-third NMOS transistor N23 may receive the data clock signal CLK1. The twenty-fourth NMOS transistor N24 may receive the voltage $V_{bd} - V_{h2d} - V_{h3d}$, and the twenty-fifth NMOS transistor N25 may receive the voltage $V_{bd} - V_{h2d} + V_{h3d}$.

Drains of the fourth NMOS transistor N4, the ninth NMOS transistor N9, the fourteenth NMOS transistor N14, the nineteenth NMOS transistor N19, and the twenty-fourth NMOS transistor N24 may be connected to a common node S1.

Drains of the fifth NMOS transistor N5, the tenth NMOS transistor N10, the fifteenth NMOS transistor N15, the twentieth NMOS transistor N20, and the twenty-fifth NMOS transistor N25 may be connected to a common node S2.

The differential input circuit 1310 may control an operation path for comparing an input signal and the voltage $V_{bd} \pm V_{h2d} \pm V_{h3d}$ according to the select signals SD3, $DFE_{D2}$, /SD3, and/$DFE_{D2}$. That is, when each of the select signals SD3 and $DFE_{D2}$ has a high level, the first receiving circuit 1311 and the third receiving circuit 1313 may operate, and the remaining receiving circuits 1312, 1314, and 1315 may be turned off.

Similarly, when each of the select signals SD3 and/$DFE_{D2}$ has a high level, the second receiving circuit 1312 and the third receiving circuit 1313 may operate, and the remaining receiving circuits 1311, 1314, and 1315 may be turned off. When each of the select signals/SD3 and/$DFE_{D2}$ has a high level, the third receiving circuit 1313 and the fourth receiving circuit 1314 may operate, and the remaining receiving circuits 1311, 1312, and 1315 may be turned off. When each of the select signals/SD3 and/$DFE_{D2}$ has a high level, the third receiving circuit 1313 and the fifth receiving circuit 1315 may operate, and the remaining receiving circuits 1311, 1312, and 1314 may be turned off. In each embodiment, when an input voltage of the third receiving circuit 1313 is greater than an input voltage of the turned-on tap receiving circuit, the amplification circuit 1320 may amplify an input voltage of the amplification circuit 1320.

The amplification circuit 1320 may include a twenty-sixth NMOS transistor N26, a twenty-seventh NMOS transistor N27, and two inverters I1 and I2. The amplification circuit 1320 may detect a comparison result of the differential input circuit 1310 and amplify the level of the differential input circuit 1310. An amplification result SD0 of the amplification circuit 1320 may be transferred to the latch 525 of FIG. 12 and the second data equalizer 521b of FIG. 12.

The equalization cell 522 may further include first to third PMOS transistors P1 to P3. The first PMOS transistor P1 and the second PMOS transistor P2 may be controlled by the data clock signal CLK1 and may provide a power voltage. A drain of the first PMOS transistor P1 may be connected to the common node S1 and the first PMOS transistor P1 may be connected to the twenty-sixth NMOS transistor N26 of the amplification circuit 1320 through the drain. A drain of the second PMOS transistor P2 may be connected to the common node S2 and the second PMOS transistor P2 may be connected to the twenty-seventh NMOS transistor N27 of the amplification circuit 1320 through the drain. The third PMOS transistor P3 may be controlled by a negative clock signal/CLK1, may provide a power voltage, and may be connected to the inverters I1 and I2 of the amplification circuit 1320 through a drain.

The equalization cell of the related art requires a separate summer, resulting in a capacitive load and a delay. On the other hand, the equalization cell 522 according to some embodiments includes a plurality of tap receiving circuits and a multiplexer to tune a reference voltage, which does not require a separate summer, thereby eliminating a capacitive load and a delay.

Referring to FIG. 14, a plurality of edge equalizers 530a according to some embodiments may equalize the first equalization signal EQF based on edge clock signals CLK0, CLK2, CLK4, CLK6, and CLK8 to output the edge bits EQE. In some embodiments, there may be a time interval of 0.5 UI between the edge clock signals CLK0, CLK2, CLK4, CLK6, and CLK8 and the data clock signals CLK1, CLK3, CLK5, CLK7, and CLK9 of FIG. 12. The edge bits EQE may include edge bits $DFE_{E0}$ to $DFE_{E4}$. The plurality of edge equalizers 530a may include a first edge equalizer 531a, a second edge equalizer 531b, a third edge equalizer 531c, a fourth edge equalizer 531d, and a fifth edge equalizer 531e. The first to fifth edge equalizers 531a to 531e may respectively output the edge bits $DFE_{E0}$ to $DFE_{E4}$. The first to fifth edge equalizers 531a to 531e have the same structure, and a clock signal input to a sampler, a select signal input to a multiplexer, and resulting output signals may be different in the first to fifth edge equalizers 531a to 531e. The select signal may be a signal that one data equalizer among the plurality of edge equalizers 530a outputs to another data equalizer. Accordingly, only the first edge equalizer 531a will be described below, and the same description may be applied to the second to fifth edge equalizers 531b to 531e.

The first edge equalizer 531a may equalize the first equalization signal EQF based on the edge clock signal CLK0 and output the edge bit $DFE_{D0}$. The first edge equalizer 531a may include an equalization cell 532 and a latch 535. The equalization cell 532 may include a multiplexer 533 and a sampler 534. The equalization cell 532 includes the same components as the equalization cell 522 described with reference to FIG. 13, and may differ only in an input signal and an output signal.

The multiplexer 533 may receive a voltage $V_{be} \pm V_{h1e} \pm V_{h2e}$ corresponding to a control code from a DAC. The voltage $V_{be} \pm V_{h1e} \pm V_{h2e}$ may correspond to a second voltage $V_{he}$ in FIG. 11. The voltage $V_{be}$ may be a bias voltage of the first edge equalizer 531a, and the voltage $V_{h1e}$ and $V_{h2e}$ may be a voltage for tuning the bias voltage. That is, a voltage $V_{be}+V_{h1e}+V_{h2e}$, a voltage $V_{be}+V_{h1e}-V_{h2e}$, a voltage $V_{be}-V_{h1e}+V_{h2e}$, and a voltage $V_{be}-V_{h1e}-V_{h2e}$ may be applied to the multiplexer 533.

The multiplexer 533 may receive select signals SE3 and $DFE_{E2}$. For example, the second edge equalizer 531b may output the select signal $DFE_{E2}$, and the fifth edge equalizer 531e may output the select signal SE3. The multiplexer 533 may select two voltages from among the voltage $V_{be} \pm V_{h1e} \pm V_{h2e}$ according to the select signals SE3 and $DFE_{E2}$.

The sampler 534 may use the two selected voltages as reference voltages. The sampler 534 may sample the first equalization signal EQF based on the edge clock signal CLK0. The sampler 544 may sample the first equalization signal EQF when a logic level of the data clock signal CLK0 transitions. For example, the sampler 534 may output a first value when the first equalization signal EQF is higher than the reference voltage, and output a second value when the first equalization signal EQF is lower than the reference voltage. An output of the sampler 534 may be input to a multiplexer of the second edge equalizer 531b as a select signal SE0. The output of the sampler 534 may be input to a latch 535.

In some embodiments, the latch 535 may be an SR latch. The latch 535 may latch the output of the sampler 534. The latch 535 may output latched data as the edge bit $DFE_{D0}$. The edge bit $DFE_{E0}$ may be input to a multiplexer of the fifth edge equalizer 531e as a select signal. Also, the edge bit $DFE_{E0}$ may be input to a CDR circuit.

Referring to FIG. 15, an error sampler 540 according to some embodiments may include a differential input circuit 1510 and an amplification circuit 1520. The differential input circuit 1510 may include a first receiving circuit 1511, a second receiving circuit 1512, a third receiving circuit 1513, a fourth receiving circuit 1514, and a fifth receiving circuit 1515. The first receiving circuit 1511, the second receiving circuit 1512, the fourth receiving circuit 1514, and the fifth receiving circuit 1515 may receive a voltage $V_{br} \pm V_{ES}$ and may be understood as tap receiving circuits. The third receiving circuit 1513 may be understood as an input signal (i.e., the first equalization signal EQF) receiving circuit.

The voltage $V_{br} \pm V_{ES}$ may correspond to a third voltage $V_{er}$ in FIG. 11. The error sampler 540 measures and outputs the highest DC level of the first equalization signal EQF according to the voltage $V_{br} \pm V_{ES}$. Then, the error sampler 540 measures and outputs the lowest AC level of the first equalization signal EQF according to the voltage $V_{br} \pm V_{ES}$. In this regard, a voltage $V_{ES}$ when measuring the DC level and a voltage $V_{ES}$ when measuring the AC level, which are received by the error sampler 540 from the DAC 510, may be different.

The controller CTRL 330 of FIG. 4 may determine a reference point for the plurality of data equalizers 520 and the plurality of edge equalizers 530 to measure an amplitude of the first equalization signal EQF based on the DC level and the AC level. For example, the controller 330 may obtain a reciprocal value of the AC level and determine an intermediate value (e.g., an arithmetic mean) of the reciprocal value and the DC level as the reference point. The controller 330 may output the second control code CTR2 according to the determined reference point. The reference point of the data equalizer 520 and the plurality of edge equalizers 530 may initially be 0 V and has a low sensing margin. However, when an adaptation is completed, a sensing margin may increase by using the reference point determined based on the DC level and the AC level.

Referring to FIG. 15 again, the error sampler 540 may select one of tap receiving circuits according to select signals SL and /SL. The select signal /SL may be a complementary signal of the select signal SL. A logic level of the select signal SL may be preset by a user using the error sampler 540. For example, when the select signal SL is set to a high level, the select signal /SL may have a low level, and when the select signal SL is set to a low level, the select signal /SL may have a high level. That is, any one of the first receiving circuit 1511 or the fifth receiving circuit 1515 may be turned on according to a logic level of the select signal SL. Regardless of the logic level of the select signal SL, the second receiving circuit 1512 and the fourth receiving circuit 1514 may be turned off. The second receiving circuit 1512 and the fourth receiving circuit 1514 may exist to provide the same internal characteristics as a data equalizer and an edge equalizer.

The error sampler 540 may receive the first equalization signal EQF and the complementary signal /EQF, which are differential signals, through the third receiving circuit 1513. The voltage $V_{br} \pm V_{ES}$ input to the first receiving circuit 1511, the second receiving circuit 1512, the fourth receiving circuit 1514, and the fifth receiving circuit 1515 may be used as a reference voltage. The tap receiving circuit (i.e., the first receiving circuit 1511 or the fifth receiving circuit 1515) selected according to the select signals SL and /SL in the equalization cell 522 may sample the first equalization signal EQF and the complementary signal /EQF by using the reference voltage, and output a sampling result to the amplification circuit 1520.

The first receiving circuit 1511 may include first to fifth NMOS transistors NM1 to NM5. The first NMOS transistor NM1 and the second NMOS transistor NM2 may receive the select signal SL, and the third NMOS transistor NM3 may receive the data clock signal CLK5. The data clock signal CLK5 is a middle data clock signal among data clock signals output by the CDR circuit 320 of FIG. 4, and may be the same as a data clock signal input to a sampler of the second data equalizer 521b of FIG. 12. The fourth NMOS transistor NM4 may receive a voltage $V_{br}+V_{ES}$, and the fifth NMOS transistor NM5 may receive a voltage $V_{br}-V_{ES}$.

The second receiving circuit 1512 may include sixth to tenth NMOS transistors NM6 to NM10. The sixth NMOS transistor NM6 may receive the select signal/SL, the seventh NMOS transistor NM7 may receive the select signal SL, and the eighth NMOS transistor NM8 may receive the data clock signal CLK5. The ninth NMOS transistor NM9 may receive the voltage $V_{br}-V_{ES}$, and the tenth NMOS transistor NM10 may receive the voltage $V_{br}+V_{ES}$.

The third receiving circuit 1513 may include eleventh to fifteenth NMOS transistors NM11 to NM15. The eleventh and twelfth NMOS transistors NM11 and NM12 may receive a power voltage, and the thirteenth NMOS transistor NM13 may receive the data clock signal CLK5. The fourteenth NMOS transistor NM14 may receive the first equalization signal EQF, and the fifteenth NMOS transistor NM15 may receive the complementary signal /EQF.

The fourth receiving circuit 1514 may include sixteenth to twentieth NMOS transistors NM16 to NM20. The sixteenth NMOS transistor NM16 may receive the select signal SL, the seventeenth NMOS transistor NM17 may receive the select signal/SL, and the eighteenth NMOS transistor NM18 may receive the data clock signal CLK5. The nineteenth NMOS transistor NM19 may receive the voltage $V_{br}-V_{ES}$, and the twentieth NMOS transistor NM20 may receive the voltage $V_{br}+V_{ES}$.

The fifth receiving circuit 1515 may include twenty-first to twenty-fifth NMOS transistors NM21 to NM25. The twenty-first NMOS transistor NM21 and the twenty-second NMOS transistor NM22 may receive the select signal/SL, and the twenty-third NMOS transistor NM23 may receive the data clock signal CLK5. The twenty-fourth NMOS transistor NM24 may receive the voltage $V_{br}+V_{ES}$, and the twenty-fifth NMOS transistor NM25 may receive the voltage $V_{br}-V_{ES}$.

Drains of the fourth NMOS transistor NM4, the ninth NMOS transistor NM9, the fourteenth NMOS transistor NM14, the nineteenth NMOS transistor NM19, and the twenty-fourth NMOS transistor NM24 may be connected to a common node SN1.

Drains of the fifth NMOS transistor NM5, the tenth NMOS transistor NM10, the fifteenth NMOS transistor NM15, the twentieth NMOS transistor NM20, and the twenty-fifth NMOS transistor NM25 may be connected to a common node SN2.

The differential input circuit 1510 may control an operation path for comparing an input signal and the voltage $V_{br}\pm V_{ES}$ according to the select signals SL and/SL. That is, when the select signal SL has a high level, the first receiving circuit 1511 and the third receiving circuit 1513 may operate, and the remaining receiving circuits 1512, 1514, and 1515 may be turned off. When the select signal SL has a low level, the third receiving circuit 1513 and the fifth receiving circuit 1515 may operate, and the remaining receiving circuits 1511, 1512, and 1514 may be turned off. When an input voltage of the third receiving circuit 1513 is greater than an input voltage of the turned-on tap receiving circuit 1511 or 1515, the amplification circuit 1520 may amplify an input voltage of the amplification circuit 1520.

The amplification circuit 1520 may include a twenty-sixth NMOS transistor NM26, a twenty-seventh NMOS transistor NM27, and two inverters IV1 and IV2. The amplification circuit 1520 may detect a comparison result of the differential input circuit 1510 and amplify the level of the differential input circuit 1510. An amplification result of the amplification circuit 1520 may be transferred to a latch.

The error sampler 540 may further include first to third PMOS transistors PM1 to PM3. The first PMOS transistor PM1 and the second PMOS transistor PM2 may be controlled by the data clock signal CLK5 and may provide a power voltage. A drain of the first PMOS transistor PM1 may be connected to the common node SN1 and the first PMOS transistor PM1 may be connected to the twenty-sixth NMOS transistor NM26 of the amplification circuit 1520 through the drain. A drain of the second PMOS transistor PM2 may be connected to the common node SN2 and the second PMOS transistor PM2 may be connected to the twenty-seventh NMOS transistor NM27 of the amplification circuit 1520 through the drain. The third PMOS transistor PM3 may be controlled by a negative clock signal/CLK5, may provide a power voltage, and may be connected to the inverters IV1 and IV2 of the amplification circuit 1520 through a drain.

Figure 16:
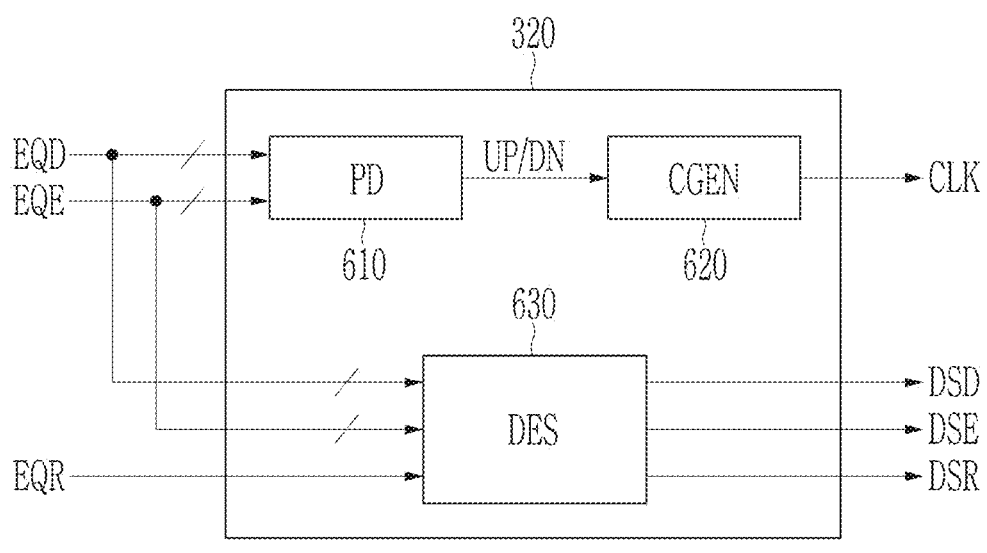
FIG. 16 is a block diagram of a clock data recovery circuit according to some embodiments.

FIG. 16 is a block diagram of a CDR circuit according to some embodiments.

Referring to FIG. 16, the CDR circuit 320 according to some embodiments may generate a restored clock signal CLK based on the data bits EQD and the edge bits EQE. The restored clock signal CLK may include the data clock signal CKD, the edge clock signal CKE, and the error clock signal CKR. The CDR circuit 320 may deserialize the data bits EQD, the edge bits EQE, and the error value EQR to output the signals DSD, DSE, and DSR.

The CDR circuit 320 according to some embodiments may include a phase detector PD 610, a clock generator CGEN 620, and a deserializer DES 630.

The phase detector PD 610 may determine whether the data bits EQD and the edge bits EQE are the same. For example, the phase detector 610 may include an exclusive OR (XOR) gate. The XOR gate may compare data bits and edge bits, which are adjacent sampling result values, among the data bits EQD and the edge bits EQE. The phase detector 610 may output an up signal UP or a down signal DN according to a determination result.

In an embodiment, the data bits EQD may include first to fifth data bits, and the edge bits EQE may include first to fifth edge bits. Here, the first edge bit may be an edge sampling result between the first data bit and the second data bit. The phase detector 610 may compare the first data bit with the first edge bit. When the first data bit and the first edge bit are the same, the phase detector 610 may output an up signal UP for pushing back the clock signal CLK. When the first data bit and the second edge bit are the same, the phase detector 610 may output a down signal DN for pulling the clock signal CLK forward. The up signal UP and the down signal DN may include information about sampling time points of data bits and edge bits that are comparison targets. Similarly, the phase detector 610 may compare the first edge bit with the second data bit, and also compare the remaining data bits with the remaining edge bits.

The clock signal generator 620 may control a phase of the clock signal CLK in response to the up signal UP or the down signal DN of the phase detector 610. The clock signal generator 620 may pull or push the phase of the clock signal CLK at a sampling time point. The clock signal generator 620 may output the restored clock signal CLK.

The deserializer DES 630 may output the deserialized signals DSD, DSE, and DSR from the plurality of data bits EQD, the plurality of edge bits EQE, and the error value EQR. The signals DSD, DSE, and DSR may be input to a controller and used to generate control codes.

Figure 17:
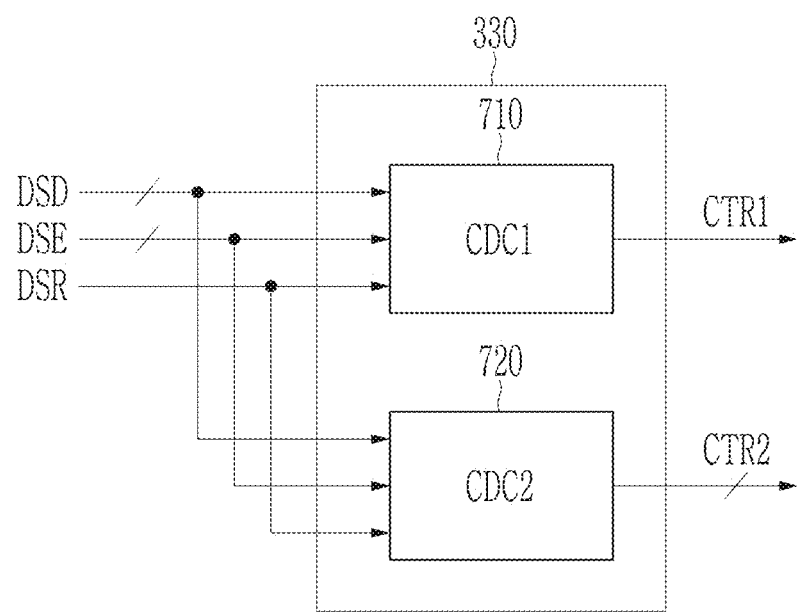
FIG. 17 is a block diagram of a controller according to some embodiments.

FIG. 17 is a block diagram of a controller according to some embodiments.

Referring to FIG. 17, a controller CTRL 330 according to some embodiments may output the first control code CTR1 and the second control code CTR2 based on the signals DSD, DSE, and DSR. The first control code CTR1 may be a code for controlling an equalization coefficient of a first equalizer, and the second control code CTR2 may be a code for controlling an equalization coefficient of a second equalizer.

The controller CTRL 330 may include a first code decision circuit CDC1 710 and a second code decision circuit CDC2 720. The first code decision circuit CDC1 710 may output the first control code CTR1 based on the signals DSD, DSE, and DSR. The first code decision circuit 710 may determine tap coefficients from the signals DSD, DSE, and DSR. The first code decision circuit 710 may generate an accumulation value by accumulating tap coefficients and perform an operation by using a weight value on the accumulation value. The first code decision circuit 710 may generate the first control code CTR1 based on an operation result. The first code decision circuit 710 may include a weighted summer performing an operation. The first code decision circuit 710 may compare the operation result with a previous operation result and increase, decrease, or maintain a value of the first control code CTR1 according to a comparison result. That is, the first code decision circuit 710 may increase the value of the first control code CTR1 in an under-equalized state and decrease the value of the first control code CTR1 in an over-equalized state to perform adaptation so that the first equalizer is in a good equalized state.

The second code decision circuit 720 may determine tap coefficients from the signals DSD, DSE, and DSR. The second code decision circuit 720 may generate an accumulation value by accumulating tap coefficients and generate the second control code CTR2 based on the accumulation value. The second code decision circuit 720 may compare an operation result with a previous operation result and increase or decrease a value of the second control code CTR2 according to a comparison result. That is, the second code decision circuit 720 may increase the value of the second control code CTR2 in the under-equalized state and decrease the value of the second control code CTR2 in the over-equalized state to perform adaptation so that the second equalizer is in a good equalized state.

Figure 18:
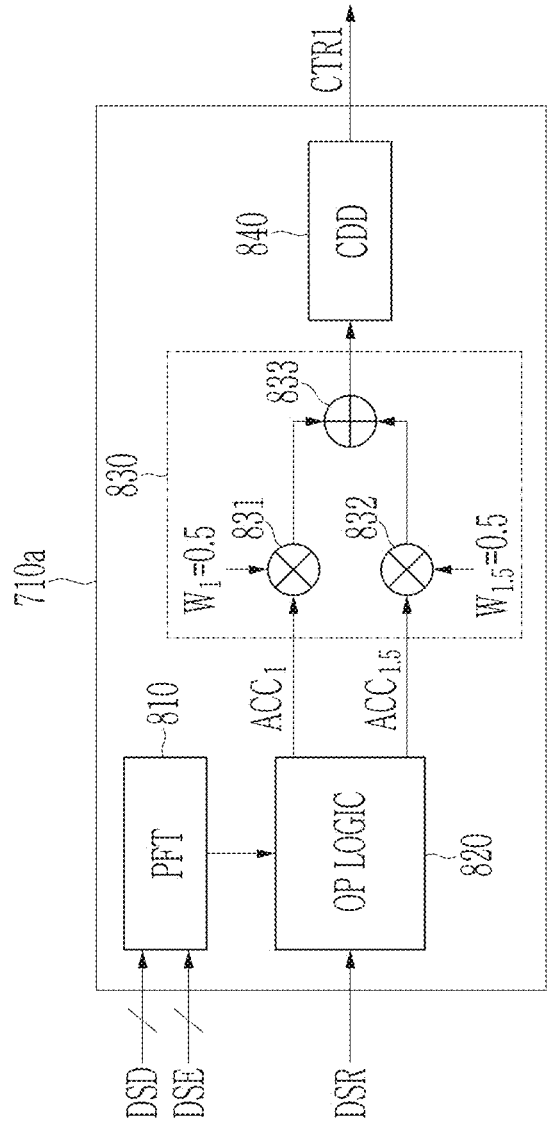
FIG. 18 is a block diagram of a first code decision circuit according to some embodiments.
Figure 19:
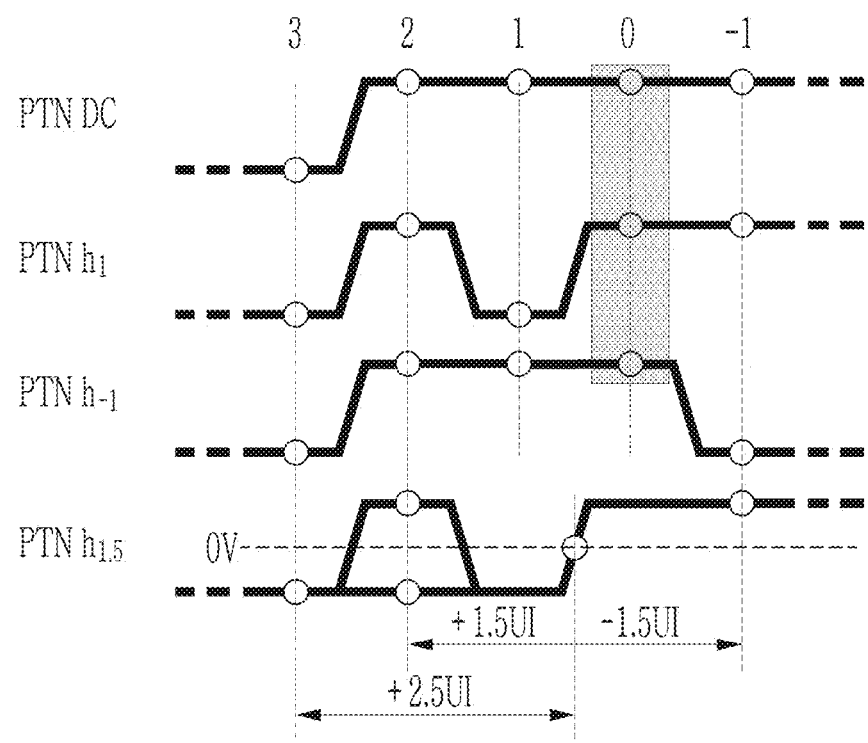
FIG. 19 is a diagram for explaining operations of a pattern filter and an operation logic according to some embodiments.
Figure 20:
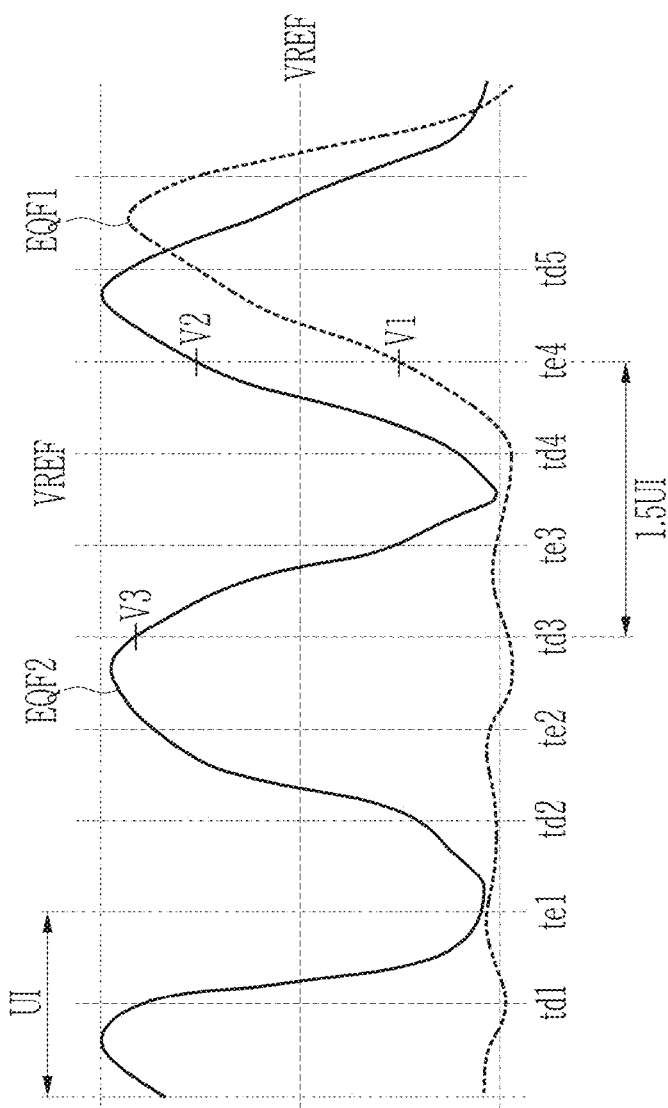
Figure 22:
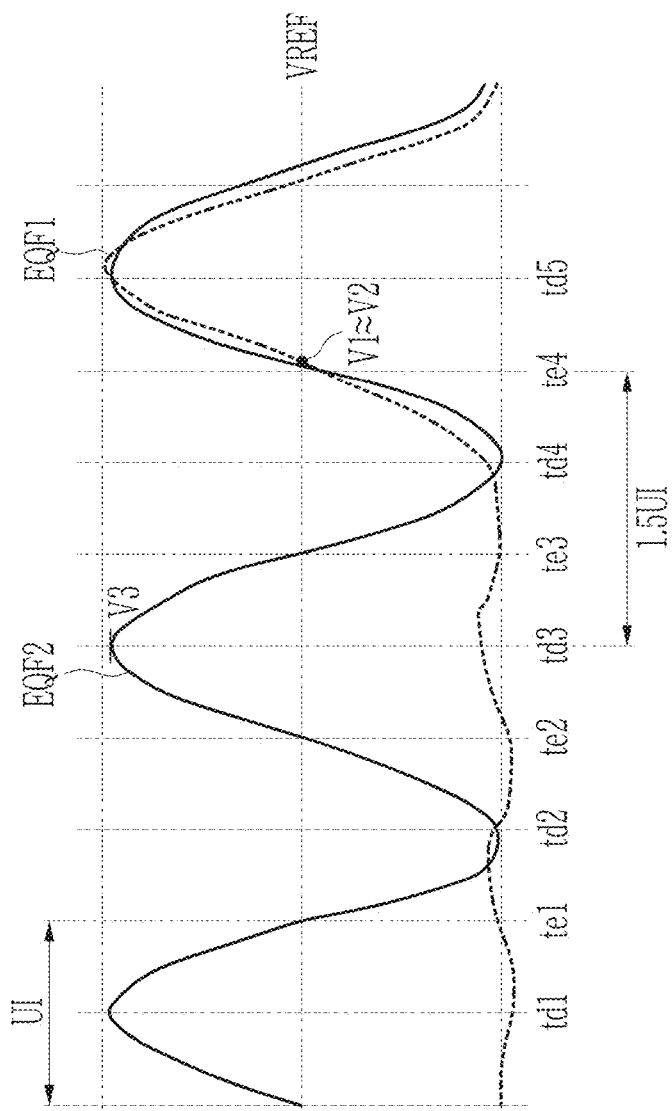
Figure 24:
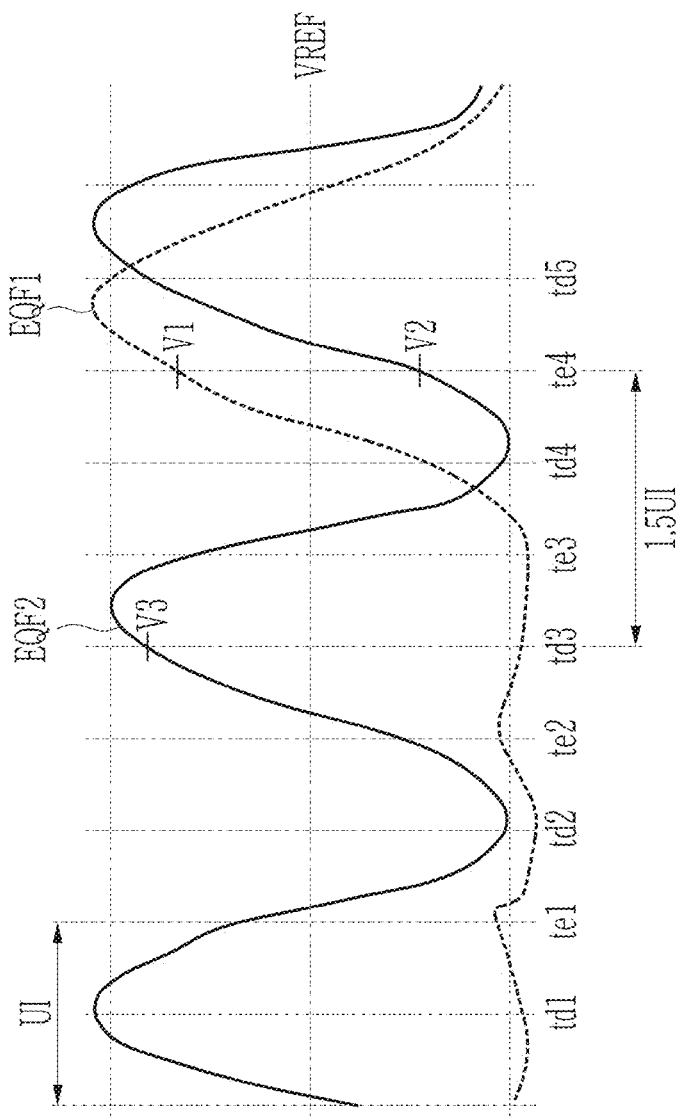
Figure 26:
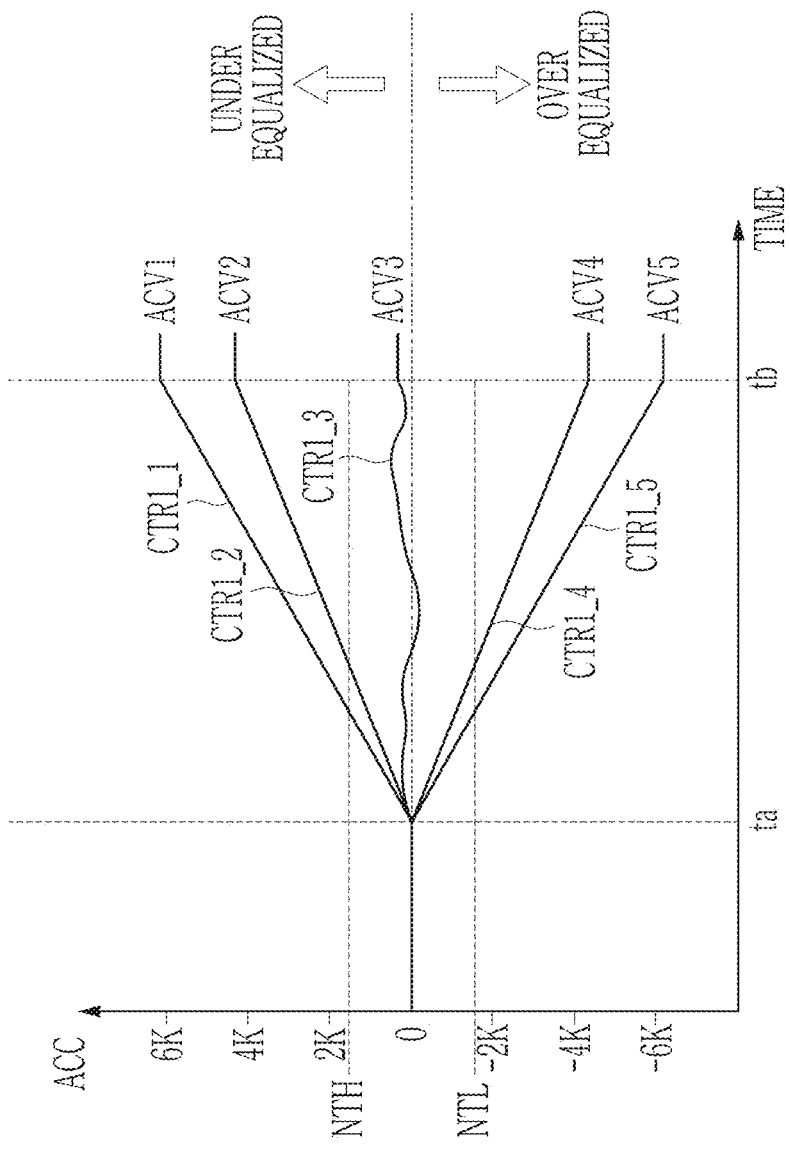
FIG. 26 is a diagram for explaining an operation of an operation logic according to an equalized state according to some embodiments.
Figure 27:
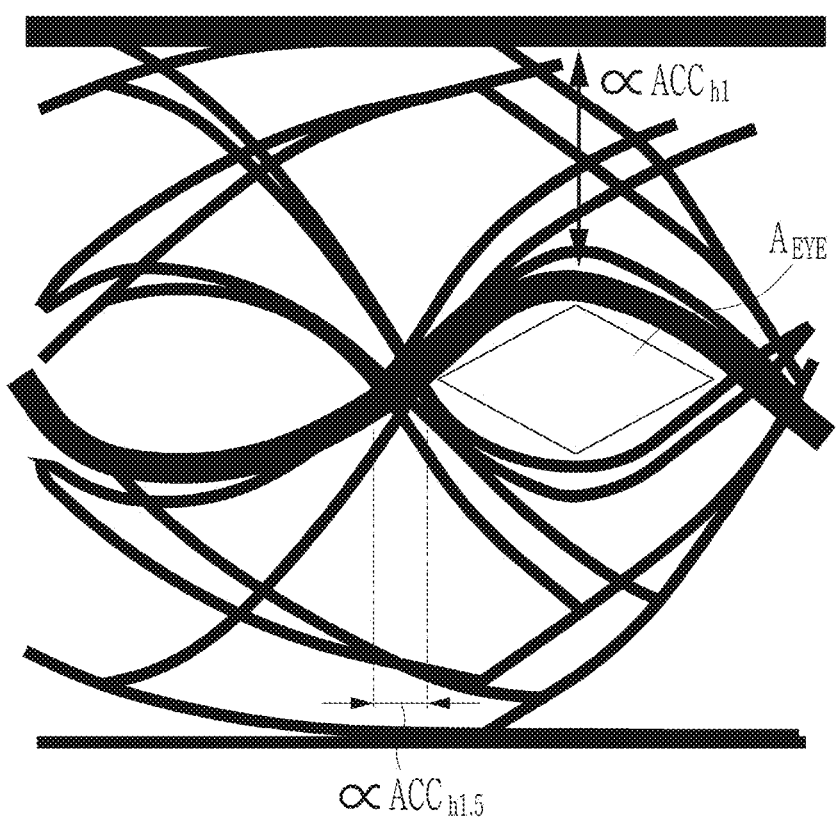
FIG. 27 is a diagram for explaining an operation of a weighted summer according to some embodiments.
Figure 28:
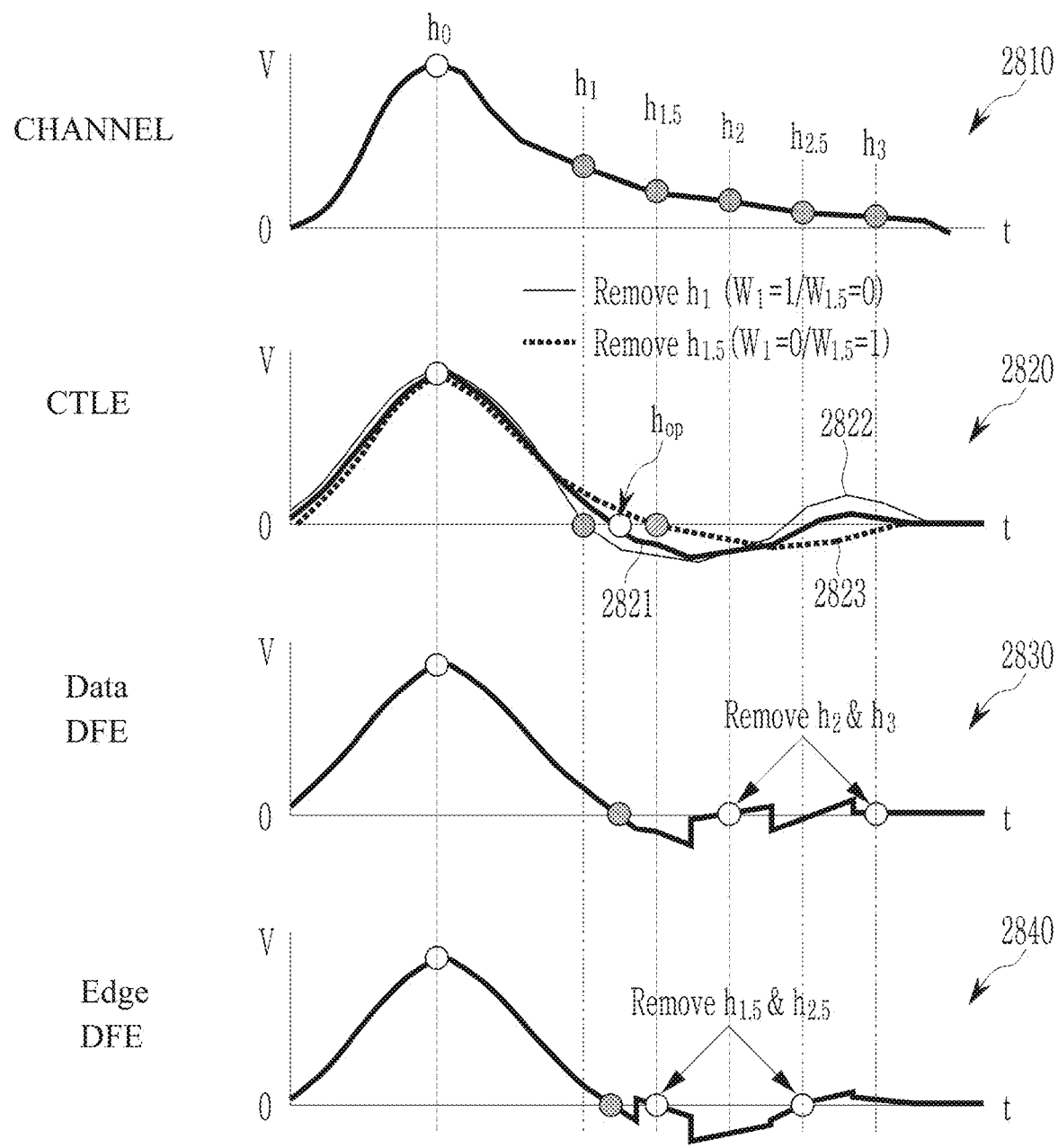
FIG. 28 is a graph of signals output by components of an electronic system according to some embodiments.

FIG. 18 is a block diagram of a first code decision circuit according to some embodiments. FIG. 19 is a diagram for explaining operations of a pattern filter and an operation logic according to some embodiments. FIGS. 20 and 21 are diagrams for explaining operations of a pattern filter and an operation logic in an under-equalized state according to some embodiments. FIGS. 22 and 23 are diagrams for explaining operations of a pattern filter and an operation logic in a good equalized state according to some embodiments. FIGS. 24 and 25 are diagrams for explaining operations of a pattern filter and an operation logic in an over-equalized state according to some embodiments. FIG. 26 is a diagram for explaining an operation of an operation logic according to an equalized state according to some embodiments. FIG. 27 is a diagram for explaining an operation of a weighted summer according to some embodiments. FIG. 28 is a graph of signals output by components of an electronic system according to some embodiments.

Referring to FIG. 18, a first code decision circuit 710a according to some embodiments may generate the first control code CTR1 based on the signals DSD, DSE, and DSR. The first code decision circuit 710a may include a pattern filter PFT 810, an operation logic OP LOGIC 820, a weighted summer 830, and a code determiner CDD 840.

The pattern filter PFT 810 may filter (select) a signal having a specific pattern from the signals DSD and DSE. The signals DSD and DSE may be signals including a plurality of bits, the specific pattern may be expressed as a combination of a low level and a high level, and may be determined according to the number of bits of the signals DSD and DSE. In an embodiment, the signals DSD and DSE are 5-bit signals, and the pattern filter 810 may filter signals having the specific pattern among the signals DSD and DSE. For example, the specific pattern may be 'L-H-H-H-H', 'L-H-L-H-H', 'L-H-H-H-L', 'L-H-L-H-H', 'L-L-L-H-H', etc. Here, 'L' may indicate a low level, and 'H' may indicate a high level.

The operation logic OP LOGIC 820 may determine a voltage relation expression from the signal filtered by the pattern filter 810. For example, the operation logic 820 may determine the voltage relation expression using an SSLMS algorithm. The voltage relation expression may be an expression representing interferences of a pre-cursor and a post-cursor to a main cursor.

The operation logic 820 may determine a tap coefficient from a plurality of voltage relation expressions. The tap coefficient may indicate the interference of the pre-cursor or the post-cursor to the main cursor. The operation logic 820 may determine a tap coefficient for each cursor. For example, a tap coefficient corresponding to a cursor positioned at +t UI (t is a real number) with respect to the main cursor may be expressed as $h_t$. That is, a tap coefficient corresponding to a post-cursor positioned at +1 UI with respect to the main cursor may be expressed as $h_1$, and a tap coefficient corresponding to a post-cursor positioned at +1.5 UI with respect to the main cursor may be expressed as $h_{1.5}$. A tap coefficient corresponding to a pre-cursor positioned at −1 UI with respect to the main cursor may be expressed as $h_{-1}$. The first code decision circuit 710a may determine the first control code CTR1 so that a value of a signal between the tap coefficient $h_1$ and the tap coefficient $h_{1.5}$ converges to 0.

Referring to FIG. 19 together with FIG. 18, the pattern filter 810 may filter signals matching patterns PTN DC, PTN $h_1$, and PTN $h_{1.5}$ among the signals DSD and DSE. (It is noted that pattern PTN h-1 will be described later with respect to FIG. 29.) The pattern PTN DC may be 'L-H-H-H-H', the pattern PTN $h_1$ may be 'L-H-L-H-H', and the patterns PTN $h_{1.5}$ may be 'L-H-L-H-H' and 'L-L-L-H-H'. In an upper end of FIG. 19, '−1' may correspond to the data bit $DFE_{D1}$, '0' may correspond to the data bit $DFE_{D2}$, '1' may correspond to the data bit $DFE_{D3}$, '2' may correspond to the data bit $DFE_{D4}$, and '3' may correspond to the following data bit $DFE_{D0}$.

The operation logic 820 may determine a plurality of voltage relation expressions respectively corresponding to the patterns PTN DC, PTN $h_1$, and PTN $h_{1.5}$. The operation logic 820 may determine a voltage relation expression for the pattern PTN DC as shown in Equation 2.

$$D_{DC}(t) = -h_3 + h_2 + h_1 + h_0 + h_{-1} \tag{Equation 2}$$

$D_{DC}(t)$ represents an analog voltage at the main cursor of the pattern PTN DC, $h_3$ represents an interference of a post-cursor of +3 UI to the main cursor, $h_2$ represents an interference of a post-cursor of +2 UI to the main cursor, $h_1$ represents an interference of a post-cursor of +1 UI to the main cursor, $h_0$ represents a value of the main cursor, and $h_{-1}$ represents an interference of a pre-cursor of −1 UI to the main cursor. In Equation 2, −1, +1, +1, +1, and +1, which are coefficients of $h_3$, $h_2$, $h_1$, $h_0$, and $h_{-1}$ correspond to the pattern PTN DC of 'L-H-H-H-H'.

The operation logic 820 may determine a voltage relation expression for the pattern PTN $h_1$ as shown in Equation 3.

$$D_{h1}(t) = -h_3 + h_2 - h_1 + h_0 + h_{-1} \quad \text{(Equation 3)}$$

$D_{h1}(t)$ represents an analog voltage at the main cursor of the pattern PTN $h_1$, $h_3$ represents an interference of a post-cursor of +3 UI to the main cursor, $h_2$ represents an interference of a post-cursor of +2 UI to the main cursor, $h_1$ represents an interference of a post-cursor of +1 UI to the main cursor, $h_0$ represents a value of the main cursor, and $h_{-1}$ represents an interference of a pre-cursor of −1 UI to the main cursor. In Equation 3, −1, +1, −1, +1, and +1, which are coefficients of $h_3$, $h_2$, $h_1$, $h_0$, and $h_{-1}$ correspond to the pattern PTN $h_1$ of 'L-H-L-H-H'.

The operation logic 820 may determine a voltage relation expression for the patterns PTN $h_{1.5}$ as shown in Equation 4. The pattern filter 810 may filter signals having two types of patterns.

$$D_{h1.5\_1}(t) = -h_{2.5} + h_{1.5} + h_{-1.5}$$

$$D_{h1.5\_2}(t) = -h_{2.5} - h_{1.5} + h_{-1.5} \quad \text{(Equation 4)}$$

$D_{h1.5\_1}(t)$ represents an analog voltage at the main cursor of the pattern PTN $h_{1.5}$ of 'L-H-L-H-H', $D_{h1.5\_2}(t)$ represents an analog voltage at the main cursor of the pattern PTN $h_{1.5}$ of 'L-L-L-H-H', $h_{2.5}$ represents an interference of a post-cursor of +2.5 UI to the main cursor, $h_{1.5}$ represents an interference of a post-cursor of +1.5 UI to the main cursor, and $h_{-1.5}$ represents an interference of a pre-cursor of −1.5 UI to the main cursor. In Equation 4, −1, ±1, and +1, which are coefficients of $h_{2.5}$, $h_{1.5}$, $h_{-1.5}$ respectively correspond to the patterns PTN $h_{1.5}$.

The operation logic 820 may calculate a difference between $D_{DC}(t)$ of Equation 2 and $D_{h1}(t)$ of Equation 3 to determine the tap coefficient $h_1$. The operation logic 820 may calculate a difference between $D_{h1.5\_1}(t)$ and $D_{h1.5\_2}(t)$ of Equation 4 to determine the tap coefficient $h_{1.5}$.

The operation logic 820 may include a counter that outputs accumulation values $ACC_1$ and $ACC_{1.5}$. The operation logic 820 may output the accumulation values $ACC_1$ and $ACC_{1.5}$ to the weighted summer 830. The operation logic 820 may generate the accumulation values $ACC_1$ and $ACC_{1.5}$ based on the data bits DSD and the error bit DSR. For example, the operation logic 820 may generate the accumulation values $ACC_1$ and $ACC_{1.5}$ using Equation 5.

$$ACC_W u+1 = ACC_W(u) + \Delta_w * (\text{sign}(d_{n-w}) * \text{sign}(e_n)) \quad \text{(Equation 5)}$$

Here, w may be a cursor number including an ISI to be removed as a real number, and may be a value corresponding to a tap coefficient $h_w$. $ACC_W(u)$ may be a value obtained by performing accumulation according to Equation 5 u times. $\Delta w$ may be a value representing a speed of adaptation. For example, when $\Delta w$ is small, the adaptation speed may be slow, and when $\Delta w$ is large, the adaptation speed may be fast. In some embodiments, $\Delta w$ may be predetermined by a user. In an embodiment, $\Delta w$ may be set to 1. $d_{n-w}$ is data at +w UI time point with respect to a sampling time point, $\text{sign}(d_{n-w})$ is a sign of $d_{n-w}$, and $\text{sign}(e_n)$ is a sign of $e_n$, which is the error bit DSR at the sampling time point. For example, in the case of $ACC_1(u)$, $d_{n-w}$ may be a value obtained by accumulating a value corresponding to a post-cursor of +w UI u times with respect to a data sampling time point, and in the case of $ACC_{1.5}(u)$, $d_{n-w}$ may be a value obtained by accumulating a value corresponding to a post-cursor of +1.5 UI u times with respect to an edge sampling time point. The operation logic 820 may use $ACC_W u+1$ as an accumulation value $ACC_w$ at a specific time point when accumulation is performed u+1 times.

In the foregoing, only configurations determining $h_1$ and $h_{1.5}$ have been described for convenience of explanation, but the same method may be applied to $h_2$, $h_{2.5}$, $h_3$, etc.

In FIGS. 20 to 26, a configuration in which the operation logic 820 calculates the accumulation value $ACC_{1.5}$ is described.

In FIG. 20, the relationship between sample bits in an under-equalized state is described. In FIG. 20, td1 to td5 indicate data sampling time points, and te1 to te4 indicate edge sampling time points.

Referring to FIG. 20, waveforms of an equalization signal EQF1 of a low frequency pattern and an equalization signal EQF2 of a high frequency pattern in the under-equalized state are shown together. In the under-equalized state, an edge at the edge sampling time point te4 in the equalization signal EQF1 of the low frequency pattern is delayed from the edge sampling time point te4 because data at the data sampling time point td3 preceding by 1.5 UI has a low level. In the under-equalized state, an edge at the edge sampling time point te4 in the equalization signal EQF2 of the high frequency pattern is advanced from the edge sampling time point te4 because data at the data sampling time point td3 preceding by 1.5 UI has a high level.

Due to an ISI, a result of comparing and sampling a signal level V3 at the data sampling time point td3 and signal levels V1 and V2 at the edge sampling time point te4 with a reference voltage VREF is shown in FIG. 21.

As shown in FIG. 21, in the under-equalized state, regardless of the equalization signal EQF1 of the low frequency pattern and the equalization signal EQF2 of the high frequency pattern, the data bit at the data sampling time point td3 and the edge bit at the edge sampling time point te4 have the same logic level, i.e. the same bit value.

The operation logic 820 may obtain +1 by multiplying −1, which is the sign of td3, and −1, which is the sign of te4, in the case of the equalization signal EQF1 according to Equation 5. The operation logic 820 may obtain +1 by multiplying +1, which is the sign of td3, and +1, which is the sign of te4, in the case of the equalization signal EQF2 according to Equation 5. Accordingly, the operation logic 820 may increase the accumulation value $ACC_{1.5}$ by 1. The operation logic 820 may accurately determine an equalized state through the accumulation value $ACC_{1.5}$ obtained by accumulating values according to Equation 5.

In FIG. 22, the relationship between sample bits in a good equalized state is described. In FIG. 22, td1 to td5 represent data sampling time points, and te1 to te4 represent edge sampling time points.

Referring to FIG. 22, in a good equalized state, the data sampling points td1 to td5 are positioned very close to the center of each data bit, and the edge sampling time points te1 to te4 are positioned very close to each edge. A result of comparing and sampling the signal level V3 at the data sampling time point td3 and the signal levels V1 and V2 at the edge sampling time point te4 with the reference voltage VREF is shown in FIG. 23.

As shown in FIG. 23, in a good equalized state, signal levels of the equalization signals EQF1 and EQF2 at the edge sampling time point te4 may approach the reference voltage VREF. As a result, the data bit at the data sampling time point td3 and the edge bit at the edge sampling time point te4 may have the same bit value as in the under-equalized state or have different bit values as in the over-equalized state. In other words, in the good equalized state, a probability of being determined as the under-equalized state and a probability of being determined as the over-equalized state are almost the same.

The operation logic 820 may obtain +1 or −1 by multiplying −1, which is the sign of td3, and +1 or −1, which is the sign of te4, in the case of the equalization signal EQF1 according to Equation 5. The operation logic 820 may obtain +1 or −1 by multiplying +1, which is the sign of td3, and +1 or −1, which is the sign of te4, in the case of the equalization signal EQF2 according to Equation 5. Accordingly, the operation logic 820 may increase the accumulation value $ACC_{1.5}$ by 1 or decrease the accumulation value $ACC_{1.5}$ by 1 at a similar probability. The operation logic 820 may accurately determine the equalized state through the accumulation value $ACC_{1.5}$ obtained by accumulating values according to Equation 5.

In FIG. 24, the relationship between sample bits in the over-equalized state is described. In FIG. 24, td1 to td5 indicate data sampling time points, and te1 to te4 indicate edge sampling time points.

Referring to FIG. 24, waveforms of the equalization signal EQF1 of a low frequency pattern and the equalization signal EQF2 of a high frequency pattern in the over-equalized state are shown together. In the over-equalized state, an edge of the edge sampling time point te4 in the equalization signal EQF1 of the low frequency pattern is advanced from the edge sampling time point te4 because data of the data sampling time point td3 preceding by 1.5 UI has a low level. In the over-equalized state, an edge of the edge sampling time point te4 in the equalization signal EQF2 of the high frequency pattern is delayed from the edge sampling time point te4 because data at the data sampling time point td3 preceding by 1.5 UI has a high level.

Due to an ISI, a result of comparing and sampling the signal level V3 at the data sampling time point td3 and the signal levels V1 and V2 at the edge sampling time point te4 with the reference voltage VREF is shown in FIG. 25. As shown in FIG. 25, in the under-equalized state, regardless of the equalization signal EQF1 of the low frequency pattern and the equalization signal EQF2 of the high frequency pattern, the data bit at the data sampling time point td3 and the edge bit at the edge sampling time point te4 have different logic levels, i.e. different bit values.

The operation logic 820 may obtain −1 by multiplying −1, which is the sign of td3, and +1, which is the sign of te4, in the case of the equalization signal EQF1 according to Equation 5. The operation logic 820 may obtain −1 by multiplying +1, which is the sign of td3, and −1, which is the sign of te4, in the case of the equalization signal EQF2 according to Equation 5. Accordingly, the operation logic 820 may decrease the accumulation value $ACC_{1.5}$ by 1. The operation logic 820 may accurately determine the equalized state through the accumulation value $ACC_{1.5}$ obtained by accumulating values according to Equation 5.

According to various embodiments, an equalized state may be accurately determined according to an accumulation value based on a data bit, an edge bit, and an error bit which are comparison targets during an accumulated time.

Referring to FIG. 26, an example of a relationship between a first control code and an accumulation value will be described, according to some embodiments. In FIG. 26, the horizontal axis represents time and the vertical axis represents the accumulation value output by a counter of an operation logic. The time to represents an accumulated start time, and the time tb represents an accumulated end time.

For example, as shown in FIG. 26, the equalized state may correspond to an under-equalized state when the first control code is a first code CTR1_1 and a second code CTR1_2, may correspond to a good equalized state when the first control code is a third code CTR1_3, and may correspond to an over-equalized state when the first control code is a fourth code CTR1_4 and a fifth code CTR1_5.

In an embodiment, the code determiner 840 of FIG. 18 may determine that an equalization signal is in the under-equalized state when the accumulation value is greater than a first reference value NTH, and increase the first control code so that an equalization strength of an equalizer increases. For example, because a first accumulation value ACV1 corresponding to the first code CTR1_1 and a second accumulation value ACV2 corresponding to the second code CTR1_2 are greater than the first reference value NTH, the code determiner 840 may increase the first control code to be greater than the first code CTR1_1 and the second code CTR1_2.

In an embodiment, the code determiner 840 may determine that the equalization signal is in the over-equalized state when the accumulation value is smaller than a second reference value NTL, and decrease the first control code so that the equalization strength of the equalizer decreases. For example, because a fourth accumulation value ACV4 corresponding to the fourth code CTR1_4 and a fifth accumulation value ACV5 corresponding to the fifth code CTR1_5 are smaller than the second reference value NTL, the code determiner 840 may decrease the first control code to be smaller than the fourth code CTR1_4 and the fifth code CTR1_5.

The code determiner 840 may not adjust but maintain the first control code as it is when the accumulation value is between the first reference value NTH and the second reference value NTL. For example, because a third accumulation value ACV3 corresponding to the third code CTR1_3 is smaller than the first reference value NTH and greater than the second reference value NTL, the third code CTR1_3 remains unchanged. For convenience of explanation, the first reference value NTH and the second reference value NTL are shown at arbitrary positions in the vertical axis in FIG. 26, but are not necessarily limited thereto, and the first reference value NTH and the second reference value NTL may be changed to other values and implemented.

In FIG. 27, a method of calculating weight values $W_1$ and $W_{1.5}$ used in multipliers 831 and 832 of the weighted summer 830 of FIG. 18 is explained through an eye diagram. The receiver 300 of FIG. 1 may control an equalizer to maximize an eye area $A_{EYE}$ in the eye diagram. In FIG. 27, it may be assumed that all ISI components except for a post-cursor of +1 UI and a post-cursor of +1.5 UI are 0. That is, it may be assumed that only the post-cursor of +1 UI and the post-cursor of +1.5 UI influence a main cursor.

The eye area $A_{EYE}$ may be expressed as in Equation 6.

$$A_{EYE} \propto (ACC_{Max} - ACC_1) * (ACC_{Max} - ACC_{1.5}) \quad \text{(Equation 6)}$$

Here, $A_{EYE}$ represents the eye area, $ACC_{Max}$ represents the maximum accumulation value of a counter for the post-cursor of +1 UI, $ACC_1$ represents an accumulation value of the counter for the post-cursor of +1 UI at a time point of convergence of a CTLE, and $ACC_{1.5}$ represents an accumulation value of a counter for the post-cursor of +1.5 UI at the time point of convergence of the CTLE. $ACC_{Max} - ACC_1$ may correspond to an eye height, and $ACC_{Max} - ACC_{1.5}$ may correspond to an eye width.

That is, the eye area $A_{EYE}$ may be expressed as the product of the eye height and the eye width. When $C_1 = ACC_{Max}^2$ and $C_2 = ACC_{Max}$ are defined, Equation 6 may be expressed as Equation 7.

$$A_{EYE} \propto C_1 - C_2(ACC_1 + ACC_{1.5}) + ACC_1 * ACC_{1.5} \quad \text{(Equation 7)}$$

As the CTLE approaches a convergence, $ACC_1 * ACC_{1.5}$ may have a much smaller value than the other terms and may be ignored. As a result, Equation 7 may be simply expressed as a function of $ACC_1 * ACC_{1.5}$ as in Equation 8.

$$A_{EYE} \propto C_1 - 2C_2(0.5*ACC_1 + 0.5*ACC_{1.5}) \quad \text{(Equation 8)}$$

Therefore, when the CTLE converges to a point where $ACC_1 + ACC_{1.5}$ is minimized under the condition of the equal weight value $W_1 = W_{1.5} = 0.5$, the CTLE may have the maximum eye area $A_{EYE}$.

Referring back to FIG. 18, the weighted summer 830 may multiply and sum the weight values $W_1$ and $W_{1.5}$ to the accumulation values $ACC_1$ and $ACC_{1.5}$, respectively. The weight values $W_1$ and $W_{1.5}$ may be equal to 0.5. The weighted summer 830 may include the multipliers 831 and 832 and a summer 833. The multiplier 831 may multiply the accumulation value $ACC_1$ by the weight value $W_1$, and the multiplier 832 may multiply the accumulation value $ACC_{1.5}$ by the weight value $W_{1.5}$. The summer 833 may sum a multiplication result $ACC_1*W_1$ of the multiplier 831 and a multiplication result $ACC_{1.5}*W_{1.5}$ of the multiplier 832, and output a summation result $ACC*W_1 + ACC_{1.5}*W_{1.5}$ to the code determiner 840.

The code determiner 840 may determine the first control code CTR1 based on the summation result $ACC_1*W_1 + ACC_{1.5}*W_{1.5}$. For example, the code determiner 840 may adjust the first control code CTR1 so that the summation result $ACC_1*W_1 + ACC_{1.5}*W_{1.5}$ is minimized. The code determiner 840 may compare the current summation result $ACC_1*W_1 + ACC_{1.5}*W_{1.5}$ with a previous summation result. The code determiner 840 may increase the first control code CTR1 when the current summation result $ACC_1*W_1 + ACC_{1.5}*W_{1.5}$ is smaller than the previous summation result. The code determiner 840 may decrease the first control code CTR1 when the current summation result $ACC_1*W_1 + ACC_{1.5}*W_{1.5}$ is greater than the previous summation result. In an embodiment, the code determiner 840 may increase or decrease the first control code CTR1 by 1 bit. In an embodiment, the code determiner 840 may increase or decrease the first control code CTR1 in a binary scan method. The binary scan method may refer to a method of initially increasing bits significantly and increasing bits insignificantly in a subsequent scan.

In FIG. 28, outputs of a channel, a CTLE, a data equalizer, and an edge equalizer constituting an electronic system are explained. Referring to FIG. 28, a single pulse response graph 2810 of the channel, a single pulse response graph 2820 of the CTLE, a single pulse response graph 2830 of the data equalizer, and a single pulse response graph 2840 of the edge equalizer may be identified.

The single pulse response graph 2810 of the channel may show that data of post tap coefficients $h_1$, $h_{1.5}$, $h_2$, $h_{2.5}$, and $h_3$ have a value greater than 0. The CTLE may converge data to a point $h_{op}$ between the post tap coefficients $h_1$ and $h_{1.5}$ according to a first control code of a controller. As a result, in a graph 2821 of the single pulse response graph 2820 of the CTLE, an interference corresponding to the point $h_{op}$ has been removed.

In the single pulse response graph 2820 of the CTLE, graphs 2822 and 2823 are shown along with the graph 2821. The graph 2822 is a graph when the CTLE removes an interference of the post tap coefficient $h_1$, and the graph 2823 is a graph when the CTLE removes an interference of the post tap coefficient $h_{1.5}$. In the graphs 2822 and 2823, interferences after the post tap coefficient $h_2$ may be greater than those in the graph 2821. Therefore, it may be more effective for optimal eye opening for the CTLE to remove the interference corresponding to the point $h_{op}$ than to remove the interferences of the post tap coefficients $h_1$ and $h_{1.5}$.

The single pulse response graph 2830 of the data equalizer shows that the data equalizer has removed interferences of the post tap coefficients $h_2$ and $h_3$, and the single pulse response graph 2840 of the edge equalizer shows that the edge equalizer has removed interferences of the post tap coefficients $h_{1.5}$ and $h_{2.5}$. In FIG. 28, it has been described that a 3-tap equalizer removes the interferences of the post tap coefficients $h_1$, $h_{1.5}$, $h_2$, $h_{2.5}$, and $h_3$, but embodiments are not necessarily limited thereto, and in some embodiments, a plurality of tap equalizers may be implemented to remove interferences of a plurality of post-cursors.

Figure 29:
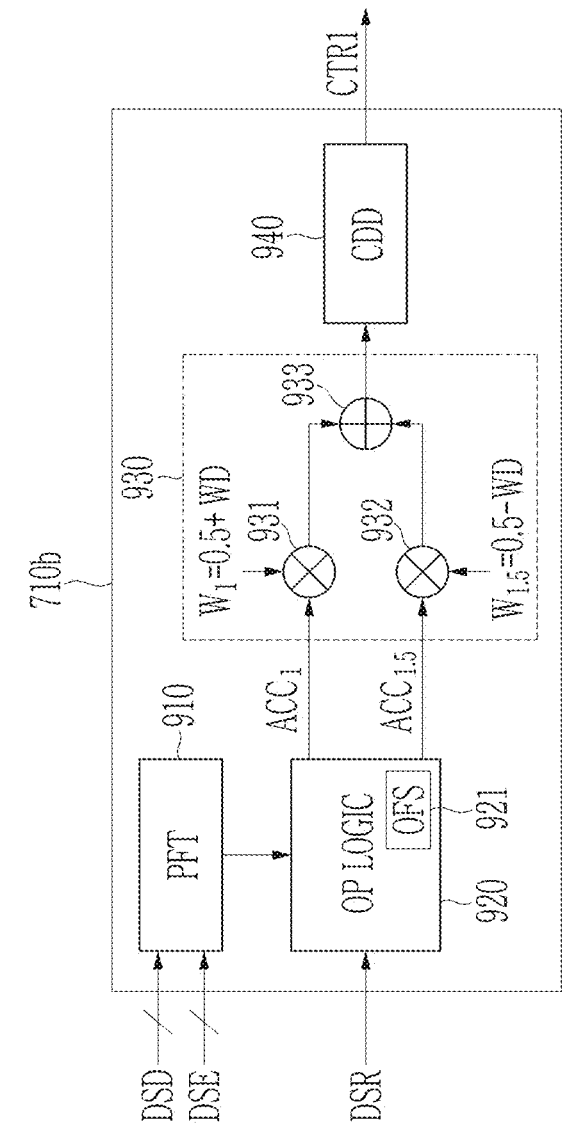
FIG. 29 is a block diagram of a first code decision circuit according to some embodiments.
Figure 30:
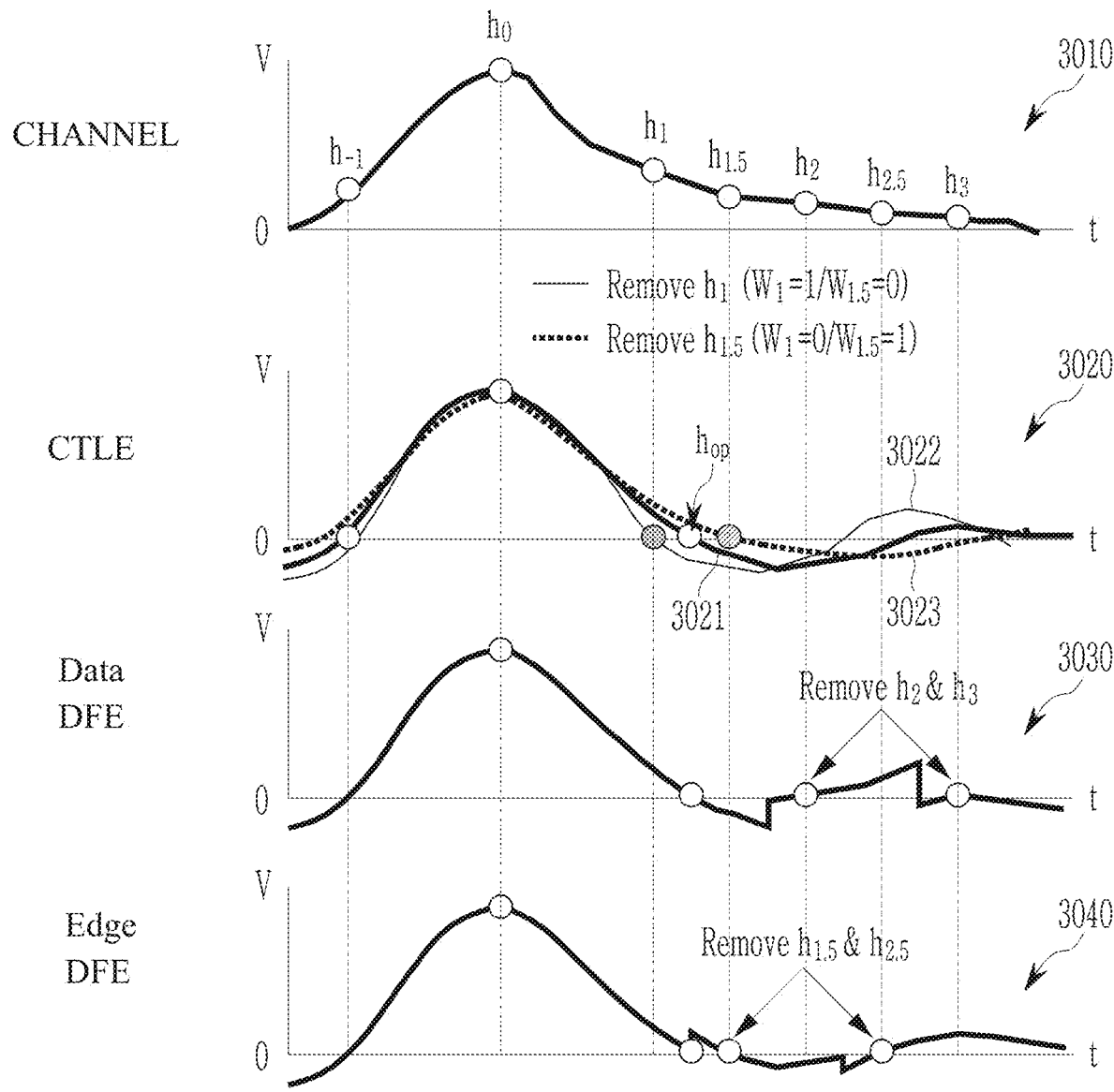
FIG. 30 is a graph of signals output by components of an electronic system according to some embodiments.

FIG. 29 is a block diagram of a first code decision circuit according to some embodiments. FIG. 30 is a graph of signals output from components of an electronic system according to some embodiments.

Referring to FIG. 29, a first code decision circuit 710b according to some embodiments may generate the first control code CTR1 based on the signals DSD, DSE, and DSR. The first code decision circuit 710b may include a pattern filter PFT 910, an operation logic OP LOGIC 920, a weighted summer 930, and a code determiner CDD 940.

The pattern filter PFT 910 may filter a signal having a specific pattern from the signals DSD and DSE. The signals DSD and DSE may be signals including a plurality of bits, the specific pattern may be expressed as a combination of a low level and a high level, and may be determined according to the number of bits of the signals DSD and DSE. In an embodiment, the signals DSD and DSE are 5-bit signals, and the pattern filter 910 may filter signals having the specific pattern among the signals DSD and DSE. For example, the specific pattern may be 'L-H-H-H-H', 'L-H-L-H-H', 'L-H-H-H-L', 'L-H-L-H-H', 'L-L-L-H-H', etc. Here, 'L' may indicate a low level, and 'H' may indicate a high level.

Referring to FIG. 19 together with FIG. 29, the pattern filter 910 may filter signals matching the patterns PTN DC, PTN $h_1$, PTN $h_{-1}$, and PTN $h_{1.5}$ among the signals DSD and DSE. The pattern PTN DC may be 'L-H-H-H-H', the pattern PTN $h_1$ may be 'L-H-L-H-H', the pattern PTN $h_{-1}$ may be 'L-H-H-H-L', and the pattern PTN $h_{1.5}$ may be 'L-H-L-H-H' and 'L-L-L-H-H'.

The operation logic OP LOGIC 920 may determine a plurality of voltage relation expressions respectively corresponding to the patterns PTN DC, PTN $h_1$, PTN $h_{-1}$, and PTN $h_{1.5}$. A voltage relation expression may be an expression representing interferences of a pre-cursor and a post-cursor to a main cursor.

The operation logic 920 may determine a tap coefficient from the plurality of voltage relation expressions. The tap coefficient may indicate the interference of the pre-cursor or the post-cursor to the main cursor. The operation logic 920 may determine a tap coefficient for each cursor. For example, a tap coefficient corresponding to a cursor positioned at +t UI (t is a real number) with respect to the main cursor may be expressed as $h_t$. That is, a tap coefficient corresponding to a post-cursor positioned at +1 UI with respect to the main cursor may be expressed as $h_1$, and a tap coefficient corresponding to a post-cursor positioned at +1.5 UI with respect to the main cursor may be expressed as $h_{1.5}$.

A tap coefficient corresponding to a pre-cursor positioned at −1 UI with respect to the main cursor may be expressed as $h_{-1}$.

The operation logic 920 may determine the tap coefficients $h_1$ and $h_{1.5}$ as described above in Equations 2 to 4. Also, the operation logic 920 may determine a voltage relation expression for the pattern PTN $h_{-1}$ as shown in Equation 9.

$$D_{h-1} = -h_3 + h_2 + h_1 + h_0 - h_{-1} \qquad \text{(Equation 9)}$$

$D_{h-1}(t)$ represents an analog voltage at the main cursor of the pattern PTN $h_{-1}$, $h_3$ represents an interference of a post-cursor of +3 UI to the main cursor, $h_2$ represents an interference of a post-cursor of +2 UI to the main cursor, $h_1$ represents an interference of a post-cursor of +1 UI to the main cursor, $h_0$ represents a value of the main cursor, and $h_{-1}$ represents an interference of a pre-cursor of −1 UI to the main cursor. In Equation 9, −1, +1, +1, +1, −1, which are coefficients of $h_3$, $h_2$, $h_1$, $h_0$, and $h_{-1}$ correspond to the pattern PTN $h_{-1}$ of 'L-H-H-H-L'.

The operation logic 920 may calculate a difference between $D_{DC}t$ of Equation 2 and $D_{h1}t$ of Equation 3 to determine the tap coefficient $h_{-1}$. The operation logic 920 may include an offset logic OFS 921 determining a weight offset WD for removing the tap coefficient $h_{-1}$. The offset logic OFS 921 may increase the weight offset WD when the tap coefficient $h_{-1}$ is greater than 0. The offset logic 921 may decrease the weight offset WD when the tap coefficient $h_{-1}$ is smaller than 0. The offset logic 921 may fix the weight offset WD when the tap coefficient $h_{-1}$ converges to 0.

The operation logic 920 may generate the accumulation values $ACC_1$ and $ACC_{1.5}$ based on Equation 5. The operation logic 920 may output the accumulation values $ACC_1$ and $ACC_{1.5}$ to the weighted summer 930.

The weighted summer 930 may multiply and sum the weight values $W_1$ and $W_{1.5}$ to the accumulation values $ACC_1$ and $ACC_{1.5}$, respectively. The weight value $W_1$ may be a value obtained by summing the weight value offset WD to 0.5. The weight value $W_{1.5}$ may be a value obtained by subtracting the weight offset WD from 0.5. The weighted summer 930 may include multipliers 931 and 932 and a summer 933. The multiplier 931 may multiply the accumulation value $ACC_1$ by the weight value $W_1$, and the multiplier 932 may multiply the accumulation value $ACC_{1.5}$ by the weight value $W_{1.5}$. The summer 933 may sum the multiplication result $ACC_1*W_1$ of the multiplier 931 and the multiplication result $ACC_{1.5}*W_{1.5}$ of the multiplier 932, and output the summation result $ACC_1*W_1+ACC_{1.5}*W_{1.5}$ to the code determiner 940.

The code determiner 940 may determine the first control code CTR1 based on the summation result $ACC_1*W_1+ACC_{1.5}*W_{1.5}$. For example, the code determiner 940 may adjust the first control code CTR1 so that the summation result $ACC_1*W_1+ACC_{1.5}*W_{1.5}$ is minimized. The code determiner 940 may compare the current summation result $ACC_1*W_1+ACC_{1.5}*W_{1.5}$ with a previous summation result. The code determiner 940 may increase the first control code CTR1 when the current summation result $ACC_1*W_1+ACC_{1.5}*W_{1.5}$ is smaller than the previous summation result. The code determiner 940 may decrease the first control code CTR1 when the current summation result $ACC_1*W_1+ACC_{1.5}*W_{1.5}$ is greater than the previous summation result. In an embodiment, the code determiner 940 may increase or decrease the first control code CTR1 by 1 bit. In an embodiment, the code determiner 940 may increase or decrease the first control code CTR1 in a binary scan method. The binary scan method may refer to a method of initially increasing bits significantly and increasing bits insignificantly in a subsequent scan.

In FIG. 30, outputs of a channel, a CTLE, a data equalizer, and an edge equalizer constituting an electronic system, according to some embodiments, are explained. Referring to FIG. 30, a single pulse response graph 3010 of the channel, a single pulse response graph 3020 of the CTLE, a single pulse response graph 3030 of the data equalizer, and a single pulse response graph 3040 of the edge equalizer may be identified.

The single pulse response graph 3010 of the channel may show that data of a pre tap coefficient $h_{-1}$ has a value greater than 0, and data of the post tap coefficients $h_1$, $h_{1.5}$, $h_2$, $h_{2.5}$, and $h_3$ have a value greater than 0. The CTLE may remove an interference of the pre tap coefficient $h_{-1}$, and converge data to the point $h_{op}$, between the post tap coefficients $h_1$ and $h_{1.5}$ according to a first control code of a controller. As a result, in a graph 3021 of the single pulse response graph 3020 of the CTLE, the interference of the pre tap coefficient $h_{-1}$ has been removed, and an interference corresponding to the point $h_{op}$ has been removed.

In the single pulse response graph 3020 of the CTLE, graphs 3022 and 3023 are shown along with the graph 3021. The graph 3022 is a graph when the CTLE removes an interference of the post tap coefficient $h_1$, and the graph 3023 is a graph when the CTLE removes an interference of the post tap coefficient $h_{1.5}$. In the graphs 3022 and 3023, interferences after the post tap coefficient $h_2$ may be greater than those in the graph 3021. Therefore, it may be more effective for optimal eye opening for the CTLE to remove the interference corresponding to the point $h_{op}$ than to remove the interferences of the post tap coefficients $h_1$ and $h_{1.5}$.

The single pulse response graph 3030 of the data equalizer shows that the data equalizer has removed interferences of the post tap coefficients $h_2$ and $h_3$, and the single pulse response graph 3040 of the edge equalizer shows that the edge equalizer has removed interferences of the post tap coefficients $h_{1.5}$ and $h_{2.5}$. In FIG. 30, it has been described that a 3-tap equalizer removes the interferences of the post tap coefficients $h_1$, $h_{1.5}$, $h_2$, $h_{2.5}$, and $h_3$, but embodiments are not necessarily limited thereto, and in some embodiments, a plurality of tap equalizers may be implemented to remove interferences of a plurality of post-cursors.

Figure 31:
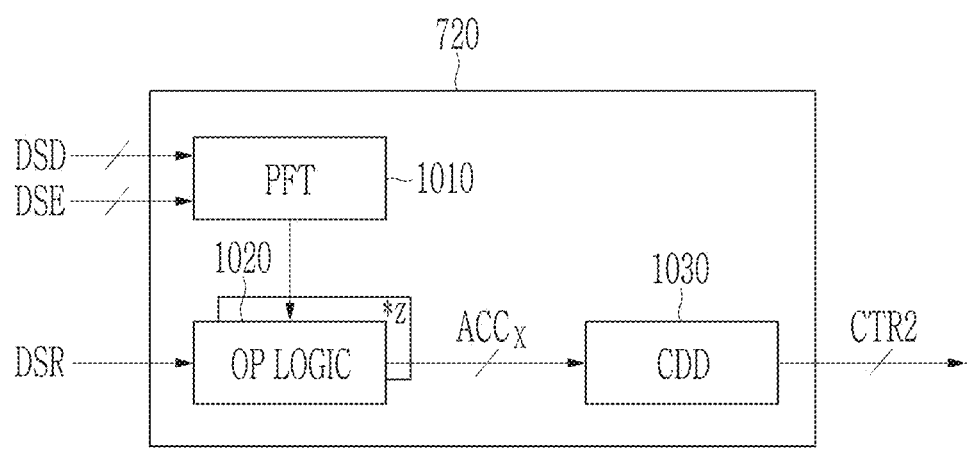
FIG. 31 is a block diagram of a second code decision circuit according to some embodiments.

FIG. 31 is a block diagram of a second code decision circuit according to some embodiments.

Referring to FIG. 31, a second code decision circuit 720 according to some embodiments may generate the second control code CTR2 based on the signals DSD, DSE, and DSR. The second code decision circuit 720 may include a pattern filter PFT 1010, an operation logic OP LOGIC 1020, and a code determiner CDD 1030.

The pattern filter PFT 1010 may filter a signal having a specific pattern from the signals DSD and DSE. The signals DSD and DSE may be signals including a plurality of bits, the specific pattern may be expressed as a combination of a low level and a high level, and may be determined according to the number of bits of the signals DSD and DSE. In an embodiment, the signals DSD and DSE are 5-bit signals, and the pattern filter 1010 may filter signals having the specific pattern among the signals DSD and DSE. For example, the specific pattern may be 'L-H-H-H-H', 'L-H-L-H-H', 'L-H-H-H-L', 'L-H-L-H-H', 'L-L-L-H-H', 'L-L-H-H-H', 'H-H-L-L', 'L-L-H-L-L', etc. Here, 'L' may indicate a low level, and 'H' may indicate a high level.

The operation logic OP LOGIC 1020 may determine a voltage relation expression from the signal filtered by the pattern filter 1010. For example, the operation logic 1020 may determine the voltage relation expression using an SSLMS algorithm. The voltage relation expression may be an expression representing an interference of a post-cursor to a main cursor.

The operation logic 1020 may determine a tap coefficient from a plurality of voltage relation expressions. The tap coefficient may indicate the interference of the post-cursor to the main cursor. The operation logic 1020 may determine a tap coefficient for each cursor. For example, a tap coefficient corresponding to a cursor positioned at +t UI (t is a real number) with respect to the main cursor may be expressed as $h_t$. That is, a tap coefficient corresponding to a post-cursor positioned at +1.5 UI with respect to the main cursor may be expressed as $h_{1.5}$, and a tap coefficient corresponding to a post-cursor positioned at +2 UI with respect to the main cursor may be expressed as $h_2$. The same description may be applied to the tap coefficients $h_{2.5}$, $h_3$, etc. In an embodiment, the second code decision circuit 720 may determine the second control code CTR2 so that the tap coefficients $h_{1.5}$, $h_2$, $h_{2.5}$, and $h_3$ converge to 0.

The operation logic 1020 may be implemented in z operation logics. Here, z may be equal to the number of tap coefficients in which the second equalizer 312 of FIG. 4 is to be removed. For example, the second equalizer 312 may remove interferences of the tap coefficients $h_{1.5}$, $h_2$, $h_{2.5}$, and $h_3$, and the operation logic 1020 may be implemented as four to output an accumulation value $ACC_X$ corresponding to the tap coefficients $h_{1.5}$, $h_2$, $h_{2.5}$, and $h_3$. x may be 1.5, 2, 2.5, 3, etc. The accumulation value $ACC_X$ corresponding to the tap coefficient $h_{1.5}$ may be expressed as $ACC_{1.5}$, the accumulation value $ACC_X$ corresponding to the tap coefficient $h_2$ may be expressed as $ACC_2$, the accumulation value $ACC_X$ corresponding to the tap coefficient $h_{2.5}$ may be expressed as $ACC_{2.5}$, and the accumulation value $ACC_X$ corresponding to the tap coefficient $h_3$ may be expressed as $ACC_3$. The operation logic 1020 may calculate the accumulation value $ACC_X$ in the manner described with reference to FIGS. 19 to 26.

The code determiner 1030 may determine the second control code CTR2 based on the accumulation value $ACC_X$. The number of second control codes CTR2 may be z corresponding to the accumulation value $ACC_X$. For example, the code determiner 1030 may increase the second control code CTR2 when the accumulation value $ACC_X$ is greater than the first reference value (e.g., NTH of FIG. 26). For example, the code determiner 1030 may decrease the second control code CTR2 when the accumulation value $ACC_X$ is smaller than the second reference value (e.g., NTL of FIG. 26). In an embodiment, the code determiner 1030 may increase or decrease the second control code CTR2 by 1 bit. In an embodiment, the code determiner 1030 may increase or decrease the second control code CTR2 in a binary scan method. The binary scan method may refer to a method of initially increasing bits significantly and increasing bits insignificantly in a subsequent scan.

Figure 32:
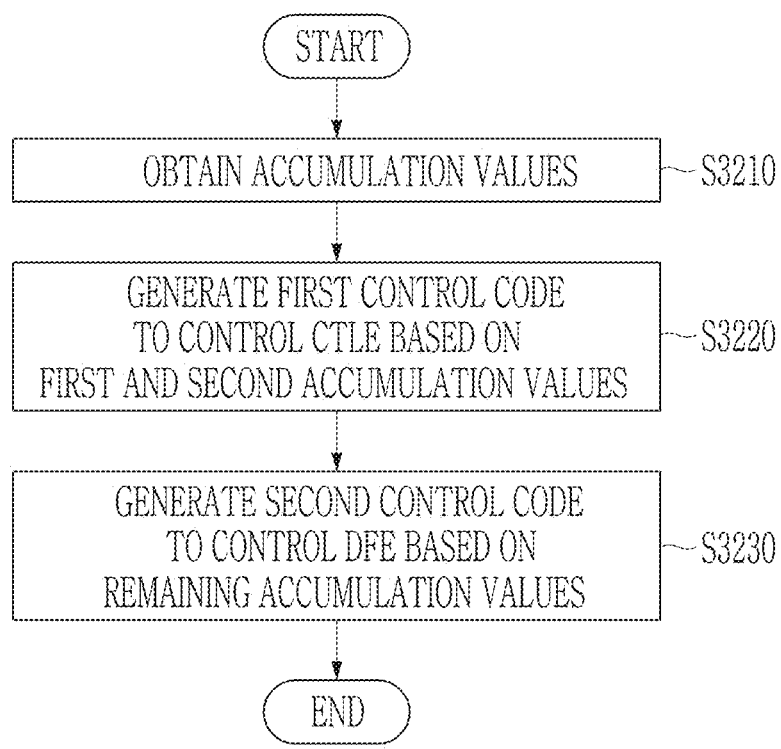
FIG. 32 is a flowchart of a method of controlling equalization according to some embodiments.

FIG. 32 is a flowchart of a method of controlling an equalization according to some embodiments.

Referring to FIG. 32, the method of controlling the equalization according to some embodiments may be performed by a controller controlling an equalizer. Here, the controller may include hardware control logic or one or more processors executing computer code stored in one or more memories.

The controller may obtain a plurality of accumulation values for determining an equalized state (S3210). The accumulation values may be obtained based on a plurality of data bits, a plurality of edge bits, and an error bit output from the equalizer. For example, the controller may filter a signal matching a pattern corresponding to a certain tap coefficient from the plurality of data bits and the plurality of edge bits. The controller may obtain an operation result value by using an SSLMS algorithm on data and error bits of the filtered signal, and accumulate the operation result value to generate an accumulation value. The controller may generate the accumulation value for each tap coefficient.

The controller may generate a first control code for controlling the CTLE based on a first accumulation value and a second accumulation value among a plurality of accumulation values (S3220). For example, the first accumulation value may correspond to the first tap coefficient $h_1$, and the second accumulation value may correspond to the second tap coefficient $h_{1.5}$.

In an embodiment, the controller may obtain a third value by summing a first value obtained by multiplying the first accumulation value by a first weight value and a second value obtained by multiplying the second accumulation value by a second weight value. The controller may adjust the first control code so that the third value is minimized.

In an embodiment, the controller may determine a weight offset corresponding to the third tap coefficient $h_{-1}$. For example, the controller may determine a weight offset at which the third tap coefficient $h_{-1}$ converges to 0. The controller may adjust the first weight and the second weight based on the weight offset. For example, the controller may sum the weight offset to the first weight and subtract the weight offset from the second weight.

The controller may generate second control codes for controlling a DFE based on the remaining accumulation values among the plurality of accumulation values (S3230). When the accumulation value indicates an over-equalized state, the controller may decrease the second control code corresponding to the accumulation value. When the accumulation value indicates an under-equalized state, the controller may increase the second control code corresponding to the accumulation value.

Figure 33:
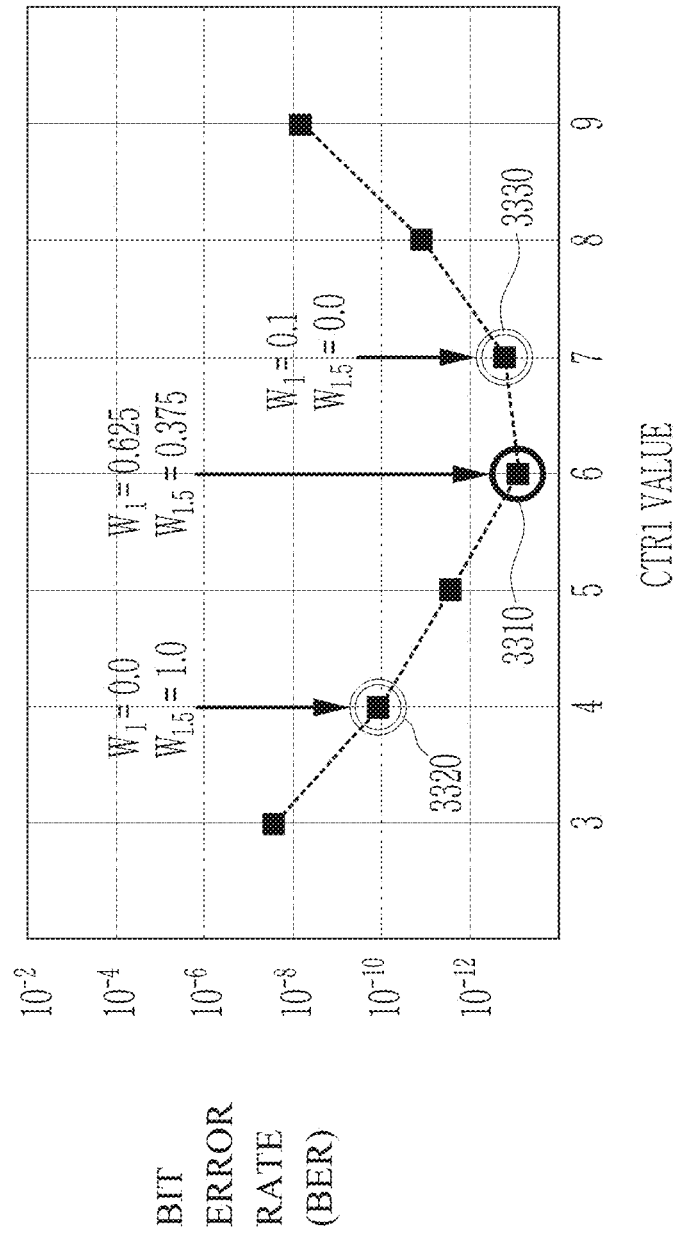
FIG. 33 is a diagram for explaining a performance of a receiver according to some embodiments.

FIG. 33 is a diagram for explaining a performance of a receiver according to some embodiments.

Referring to FIG. 33, the receiver according to some embodiments represents a bit error rate (BER) according to a value of the first control code CTR1. Referring to FIG. 29 together with FIG. 33, the weight values $W_1$ and $W_{1.5}$ applied to the weighted summer 920 may start at 0.5. The offset logic 921 may determine the weight offset WD as 0.125 while removing an ISI of the tap coefficient $h_{-1}$. As a result, the weight value $W_1$ applied to the weighted summer 930 may be 0.625, and the weight value $W_{1.5}$ may be 0.375. Referring to a point 3310, it may be seen that the first code decision circuit 710*b* using the weight value $W_1$ of 0.625 and the weight value $W_{1.5}$ of 0.375 has a value of the first control code CTR1 converging to '6', and achieves the lowest BER.

Referring to a point 3320, it may be seen that when the offset logic 921 determines the weight offset WD to be −0.5, that is, when the weight value $W_1$ is 0 and the weight value $W_{1.5}$ is 1, the first code decision circuit 710*b* has the value of the first control code CTR1 converging to '4' and has a relatively high BER.

Referring to a point 3330, it may be seen that when the offset logic 921 determines the weight offset WD to be +0.5, that is, when the weight value $W_1$ is 1 and the weight value $W_{1.5}$ is 0, the first code decision circuit 710*b* has the value of the first control code CTR1 converging to '7' and has a relatively low BER, but does not provide an optimal BER.

Figure 34:
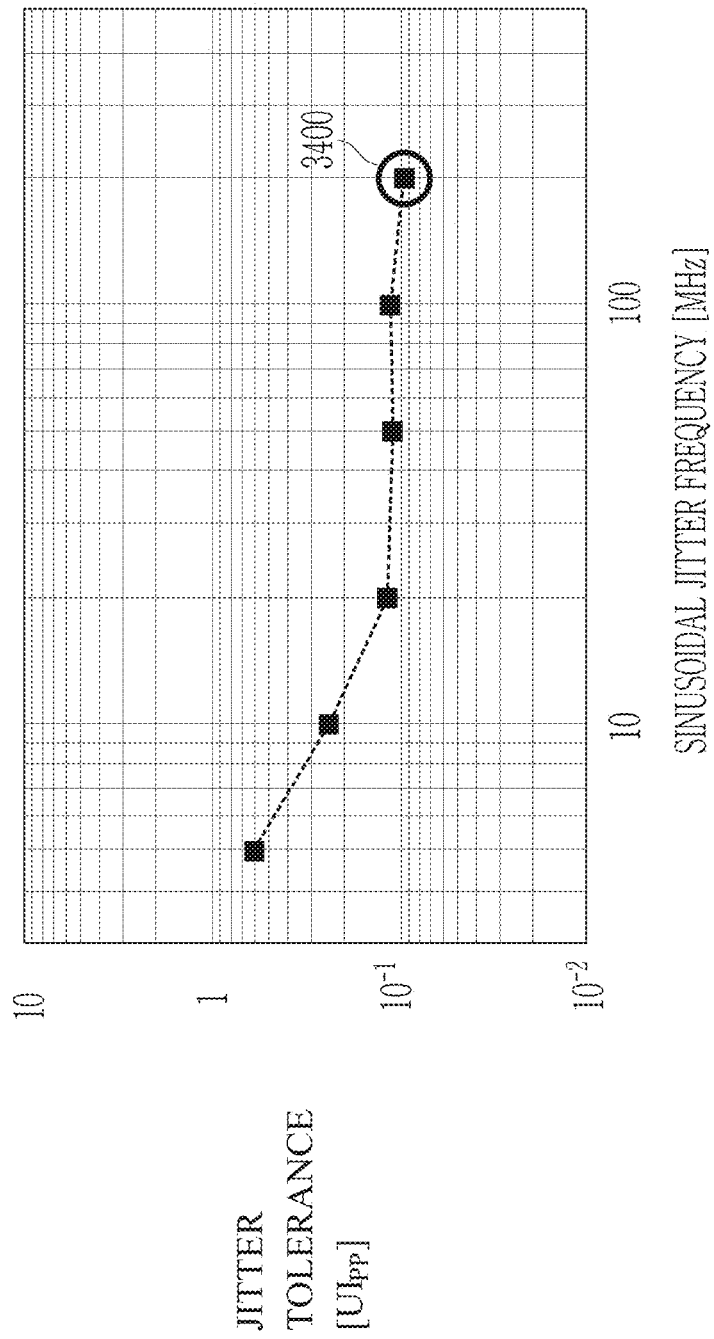
FIG. 34 is a diagram for explaining a performance of a receiver according to some embodiments.

FIG. 34 is a diagram for explaining a performance of a receiver according to some embodiments.

Referring to FIG. 34, it may be seen that the receiver according to some embodiments operates normally even when a certain level of jitter is added to data in the overall frequency domain. Referring to a point 3400 of 200 MHz, it may be seen that the lowest jitter tolerance is about $10^{-1}$, and the receiver operates normally.

Figure 35:
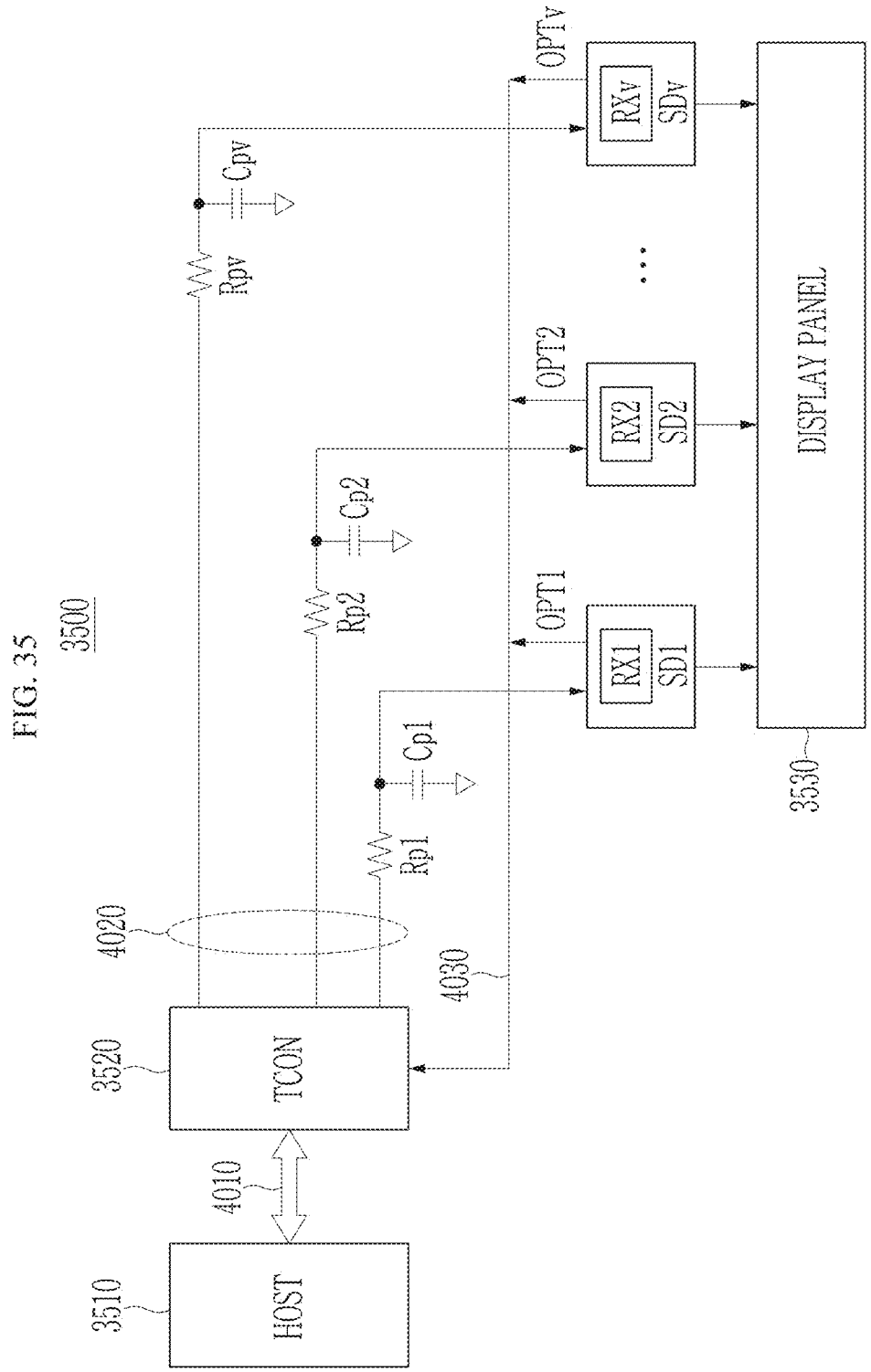
FIG. 35 is a block diagram illustrating an electronic system including a receiver according to some embodiments.

FIG. 35 is a block diagram illustrating an electronic system including a receiver according to some embodiments.

FIG. 35 shows an electronic system 3500 including a display driving circuit. For convenience of description, a display panel 3530 is shown together with the electronic system 3500.

Referring to FIG. 35, the display driving circuit may include a timing controller TCON 3520, a plurality of source drivers SD1 to SDv, a data transmission channel 4020, and a shared back channel 4030.

The timing controller TCON 3520 may transmit data to the plurality of source drivers SD1 to SDv. The data transmitted to the plurality of source drivers SD1 to SDv may be packet data including display data. Each of the plurality of source drivers SD1 to SDv may drive one or more data lines of the display panel 3530 based on the received data.

The timing controller TCON 3520 may transmit and receive data to and from the plurality of source drivers SD1 to SDv through a high speed serial interface method. An interface method between the timing controller 3520 and the plurality of source drivers SD1 to SDv is referred to as an intra panel interface.

The timing controller TCON 3520 may transmit/receive data with a host device 3510 through the communication channel 4010 in the high speed serial interface method. An interface method between the timing controller 3520 and the host device 3510 is referred to as an inter panel interface.

The timing controller TCON 3520 may be connected to the plurality of source drivers SD1 to SDv in a point-to-point method, and transmit data to each of the plurality of source drivers SD1 to SDv through different data transmission channels 4020. The timing controller 3520 transmits data to each source driver through each transmission channel.

Distances from the timing controller 3520 to the plurality of source drivers SD1 to SDv may be different from each other. Therefore, lengths of the transmission channels 4020 may be different, and parasitic resistances Rp1 to Rpv and parasitic capacitors CP1 to CPv of each of the transmission channels 4020 may be different.

Accordingly, because impedance and frequency characteristics of the transmission channels 4020 are different, each of the plurality of source drivers SD1 to SDv may perform training to optimize a reception operation according to the impedance and frequency characteristics of the corresponding transmission channel.

Specifically, the plurality of source drivers SD1 to SDv may respectively optimize reception operations of receivers RX1 to RXv by training. In addition, the plurality of source drivers SD1 to SDv may determine parameter values OPT1 to OPTv of the receivers RX1 to RXv that optimize the reception operations, respectively, and transmit the parameter values OPT1 to OPTv to the timing controller 3520. Training may include equalization operations described with reference to FIGS. 1 to 34, and the parameter values OPT1 to OPTv may include control codes.

In an embodiment, the plurality of source drivers SD1 to SDv may respectively transmit the parameter values OPT1 to OPTv to the timing controller 3510 in response to a read command received from the timing controller 3520.

The plurality of source drivers SD1 to SDv may be connected to the timing controller 3520 in a multi-drop method through the shared back channel 4030. In an embodiment, the shared back channel 4030 may be configured as one signal line. The plurality of source drivers SD1 to SDv may sequentially transmit the parameter values OPT1 to OPTv to the timing controller 3520 through the shared back channel 40. At least one of the plurality of source drivers SD1 to SDv may transmit a state information signal indicating an abnormal state in relation to a reception operation, that is, when an abnormal reception state occurs, to the timing controller 3520 through the shared back channel 4030.

The electronic system 3500 according to some embodiments may include a first device including a transmission circuit and a second device including a receiver digitally performing adaptive equalization as described above.

In an embodiment, the first device may be the host device 3510 that outputs display data to the communication channel 4010 as transmission data, and the second device may be a display device that displays an image based on the display data. In this case, the receiver according to embodiments may be included in the timing controller 3520 of the display device.

In an embodiment, the first device may be the timing controller 3520, and the second device may be the source drivers SD1 to SDv of the display device. In this case, the receivers RX1 to RXv according to the embodiments may be included in the source drivers SD1 to SDv.

FIG. 36 is a block diagram illustrating an electronic system including a receiver according to some embodiments.

FIG. 36 shows an electronic system that performs bi-directional communication. Referring to FIG. 36, an electronic system 3600 may include electronic devices 3610 and 3620. According to embodiments, each of the electronic devices 3610 and 3620 may be implemented as one of various electronic devices such as a desktop computer, a laptop computer, a tablet computer, a smart phone, a wearable device, a video game console, a home appliance, a medical device, etc.

However, the embodiments are not limited thereto, and in some embodiments, the electronic system 3600 may be implemented as a single electronic device. In embodiments implemented as a single electronic device, each of the electronic devices 3610 and 3620 may be a component or an intellectual property (IP) included in the single electronic device, and implemented as a circuit, a module, a chip, and/or an entity of a package level. The terms system and device are provided to facilitate better understanding and do not limit the embodiments.

The electronic devices 3610 and 3620 may communicate with each other and exchange data/signals through communication channels 4110 and 4120. Each of the communication channels 4110 and 4120 may include a conductive material to transfer data/signals. For example, each of the communication channels 4110 and 4120 may be implemented as a trace pattern on a printed circuit board (PCB), a lead wire of a cable, a metal pin/pad of a connector, etc. Although the two unidirectional communication channels 4110 and 4120 are shown in FIG. 36, in some embodiments, the two unidirectional communication channels 4110 and 4120 may be combined into one bidirectional communication channel.

The electronic device 3610 may include an internal circuit INT1, a serializer/deserializer SEDES1, a transmission circuit TX1, and a reception circuit RX1 that perform their unique functions. The electronic device 3620 may include an internal circuit INT2, a deserializer SEDES2, a transmission circuit TX2, and a reception circuit RX2 that perform their unique functions.

The internal circuits INT1 and INT2 may operate to provide unique functions of the electronic devices 3610 and 3620, respectively. For example, the internal circuits INT1 and INT2 may configure various components or IPs such as a processor (e.g., a central processing unit (CPU), an application processor (AP), etc.), a memory, an image sensor, a display, etc.

The electronic devices 3610 and 3620 may be implemented as separate components, IPs, or devices. Accordingly, the electronic device 3610 may be an external device with respect to the electronic device 3620, and the electronic device 3620 may be an external device with respect to the electronic device 3610.

The serializer SEDES1 may serialize data generated according to operations of the internal circuit INT1 and provide the serialized data to the transmission circuit TX1. The transmission circuit TX1 may transmit a serialized signal to the electronic device 3620 through the communication channel 4110. The reception circuit RX2 may equalize a signal received through the communication channel 4110 and restore clock and data based on the equalization signal. The serializer SEDES2 may deserialize a signal provided from the reception circuit RX2 to provide deserialized data.

The serializer SEDES2 may serialize data generated according to operations of the internal circuit INT2 and provide the serialized data to the transmission circuit TX2. The transmission circuit TX2 may transmit a serialized signal to the electronic device 3610 through the communication channel 4120. The reception circuit RX1 may equalize a signal received through the communication channel 4120 and restore clock and data based on the equalization signal. The serializer SEDES1 may deserialize a signal provided from the reception circuit RX1 to provide deserialized data.

As described above, the electronic devices 3610 and 3620 may exchange data/signals with each other through the communication channels 4110 and 4120. When the speed of communication between the electronic devices 3610 and 3620 increases (e.g., when communication is performed at a higher frequency or bandwidth), the electronic devices 3610 and 3620 may exchange a larger amount of data during a unit time.

However, due to various factors such as a skin effect, a dielectric loss, etc., each of the communication channels 4110 and 4120 may exhibit a low-pass frequency response characteristic. Thus, in a high speed operation, bandwidths of the communication channels 4110 and 4120 may be limited and may be smaller than bandwidths of signals. This may attenuate high frequency components of signals transmitted through the communication channels 4110 and 4120 and may cause an ISI in a time domain. As a result, as the speed for transmitting signals increases, the distortion of signals may increase and the quality of signals may deteriorate.

According to the embodiments, at least one of the reception circuits RX1 and RX2 may include a first equalizer that performs equalization in a frequency domain, a second equalizer that performs equalization in the time domain, a CDR circuit, and a controller to improve the quality of received signals.

In order to compensate for unintended distortion of the signals, an equalizer included in the reception circuits RX1 and RX2 may perform equalization on the received signals, and an equalizer included in the transmission circuits TX1 and TX2 may perform pre-equalization such as pre-emphasis. The equalizer included in the reception circuits RX1 and RX2 may be referred to as a reception equalizer, and the equalizer included in the transmission circuits TX1 and TX2 may be referred to as a transmission equalizer.

In some embodiments, each component or a combination of two or more components described with reference to FIGS. 1 to 36 may be implemented as a digital circuit, a programmable or unprogrammable logic device or array, an application specific integrated circuit (ASIC), etc.

Although the embodiments have been described in detail above, the scope of the present disclosure is not limited thereto, and various modifications and improvements made by those skilled in the art using the basic concept defined in the following claims also fall within the scope.

What is claimed is:

1. A receiver comprising:
a first equalizer configured to receive an input data signal through a communication channel and equalize the input data signal based on a first control code to generate a first equalization signal;
a second equalizer configured to equalize the first equalization signal based on a clock signal and a second control code to generate a second equalization signal;
a clock data recovery circuit configured to restore the clock signal based on the second equalization signal, deserialize the second equalization signal, and output a deserialized second equalization signal; and
a controller configured to adjust the first control code and the second control code based on the deserialized second equalization signal,
wherein:
the controller is further configured to obtain a plurality of accumulation values by using a sign-sign least mean square (SSLMS) algorithm on the deserialized second equalization signal, and adjust the second control code based on the plurality of accumulation values, and
the plurality of accumulation values respectively correspond to different post-cursors.

2. The receiver of claim 1, wherein:
the first equalizer is a continuous time linear equalizer (CTLE).

3. The receiver of claim 1, wherein:
the second equalizer is a decision feedback equalizer (DFE).

4. The receiver of claim 3, wherein:
the clock signal includes a plurality of data clock signals and a plurality of edge clock signals, and
the second equalizer includes:
a plurality of data equalizers configured to equalize the first equalization signal based on the plurality of data clock signals to output a plurality of data bits; and
a plurality of edge equalizers configured to equalize the first equalization signal based on the plurality of edge clock signals to output a plurality of edge bits.

5. The receiver of claim 4, wherein:
a number of the plurality of data equalizers and a number of the plurality of edge equalizers are each equal to n, the clock data recovery circuit is configured to output the clock signal at a rate of 1/n, and n is an integer greater than 1.

6. The receiver of claim 4, wherein:

the second equalizer further includes an error sampler configured to equalize the first equalization signal based on one data clock signal among the plurality of data clock signals to output an error bit, and the controller is configured to adjust the first control code and the second control code based on the plurality of data bits, the plurality of edge bits, and the error bit.

7. The receiver of claim 1, wherein:

the controller is configured to adjust the first control code by using a sign-sign least mean square (SSLMS) algorithm on the deserialized second equalization signal.

8. The receiver of claim 7, wherein:

the plurality of accumulation values comprise a first accumulation value and a second accumulation value, the controller is configured to obtain the first accumulation value and the second accumulation value by using the SSLMS algorithm on the deserialized second equalization signal, and adjust the first control code based on an operation result of applying a first weight value to the first accumulation value and applying a second weight value to the second accumulation value, and the first accumulation value and the second accumulation value respectively correspond to different post-cursors.

9. The receiver of claim 8, wherein:

the controller is configured to obtain the first accumulation value corresponding to an interference of a post-cursor of +1 unit intervals (UI) with respect to a main cursor, and obtain the second accumulation value corresponding to an interference of a post-cursor of +1.5 UI with respect to the main cursor.

10. The receiver of claim 8, wherein:

the controller is configured to decrease a value of the first control code when the operation result is higher than a previous operation result, increase the value of the first control code when the operation result is lower than the previous operation result, and maintain the value of the first control code when the operation result is equal to the previous operation result.

11. The receiver of claim 8, wherein:

the controller is configured to obtain a weight offset corresponding to an interference of a pre-cursor and adjust the first weight value and the second weight value based on the weight offset.

12. The receiver of claim 11, wherein:

the controller is configured to add the weight offset to the first weight value and subtract the weight offset from the second weight value.

13. A receiver comprising:

a first equalizer configured to output a first equalization signal by removing, from a data signal, an interference of a pre-cursor positioned at −1 (unit intervals) UI with respect to a main cursor and an interference of one post-cursor positioned between +1 UI and +1.5 UI with respect to the main cursor; and a second equalizer configured to output a second equalization signal by removing an interference of a residual post-cursor from the first equalization signal.

14. The receiver of claim 13, wherein:

the first equalizer is a continuous time linear equalizer (CTLE) configured to perform equalization in a frequency domain, and the second equalizer is a decision feedback equalizer (DFE) configured to perform equalization in a time domain.

15. The receiver of claim 13, wherein the second equalizer includes:

a differential input circuit configured to compare the first equalization signal with a reference voltage determined based on a control code of the second equalizer, and output a comparison result; and an amplification circuit configured to amplify the comparison result to generate an amplified comparison result, and output the amplified comparison result.

16. The receiver of claim 15, wherein the differential input circuit includes:

a first receiving circuit configured to receive the first equalization signal; and a plurality of second receiving circuits configured to receive different reference voltages and operate according to an internal select signal of the second equalizer.

17. The receiver of claim 16, wherein:

the plurality of second receiving circuits include four second receiving circuits, the four second receiving circuits are configured to receive four different reference voltages and four different select signals, respectively, and only one of the four second receiving circuits is turned on according to the four different select signals and operates with the first receiving circuit.

18. A method of controlling equalization, the method comprising:

obtaining a plurality of accumulation values for determining an equalized state;

generating a first control code for controlling a continuous time linear equalizer (CTLE) based on a first accumulation value among the plurality of accumulation values that corresponds to a first tap coefficient and a second accumulation value among the plurality of accumulation values that corresponds to a second tap coefficient; and generating a plurality of second control codes for controlling a decision feedback equalizer (DFE) based on remaining accumulation values other than the first accumulation value and the second accumulation value among the plurality of accumulation values.

19. The method of claim 18, wherein generating the first control code includes:

obtaining a third value by summing a first value and a second value, the first value being obtained by multiplying the first accumulation value by a first weight value and the second value being obtained by multiplying the second accumulation value by a second weight value; and adjusting the first control code to minimize the third value.

* * * * *